(12) United States Patent
Jonte et al.

(10) Patent No.: US 10,767,270 B2
(45) Date of Patent: Sep. 8, 2020

(54) ELECTRODE FOR AN OZONE GENERATOR

(71) Applicant: Delta Faucet Company, Indianapolis, IN (US)

(72) Inventors: Patrick B. Jonte, Zionsville, IN (US); Klaus Brondum, Ann Arbor, MI (US); Patrick Sullivan, Longmont, CO (US); Vladimir Gorokhovsky, Lafayette, CO (US)

(73) Assignee: Delta Faucet Company, Indianapolis, IN (US)

( * ) Notice: Subject to any disclaimer, the term of this patent is extended or adjusted under 35 U.S.C. 154(b) by 159 days.

(21) Appl. No.: 15/738,428

(22) PCT Filed: Jul. 13, 2016

(86) PCT No.: PCT/US2016/042001
§ 371 (c)(1),
(2) Date: Dec. 20, 2017

(87) PCT Pub. No.: WO2017/011506
PCT Pub. Date: Jan. 19, 2017

(65) Prior Publication Data
US 2018/0171491 A1    Jun. 21, 2018

Related U.S. Application Data

(60) Provisional application No. 62/191,741, filed on Jul. 13, 2015.

(51) Int. Cl.
*C25B 11/03* (2006.01)
*C25B 11/04* (2006.01)
(Continued)

(52) U.S. Cl.
CPC ............ *C25B 11/03* (2013.01); *C25B 1/13* (2013.01); *C25B 9/08* (2013.01); *C25B 11/0405* (2013.01);
(Continued)

(58) Field of Classification Search
CPC ...................................................... C25B 1/13
See application file for complete search history.

(56) References Cited

U.S. PATENT DOCUMENTS

| 1,000,206 A | 8/1911 | Spurge |
| 2,778,800 A | 1/1957 | Sheahan |

(Continued)

FOREIGN PATENT DOCUMENTS

| CA | 2682361 | 10/2008 |
| CN | 1565960 | 1/2005 |

(Continued)

OTHER PUBLICATIONS

Ozone Generator, www.alibaba.com/product-gs/267935887/small_ozone_generator_water_sterilizer_w; Jun. 11, 2012.
(Continued)

*Primary Examiner* — Harry D Wilkins, III
(74) *Attorney, Agent, or Firm* — Faegre Drinker Biddle & Reath LLP

(57) ABSTRACT

Electrodes for use within an ozone generator and method for assembling and using the same.

17 Claims, 27 Drawing Sheets

(51) Int. Cl.
*C25B 1/13* (2006.01)
*C25B 9/08* (2006.01)

(52) U.S. Cl.
CPC ...... *C25B 11/0421* (2013.01); *C25B 11/0447* (2013.01); *C25B 11/0478* (2013.01); *C01B 2201/12* (2013.01); *C01B 2201/22* (2013.01); *C01B 2201/24* (2013.01)

(56) References Cited

U.S. PATENT DOCUMENTS

| | | |
|---|---|---|
| 3,653,514 A | 4/1972 | Holler |
| 3,805,481 A | 4/1974 | Armstrong |
| 4,214,962 A | 7/1980 | Pincon |
| 4,352,740 A | 10/1982 | Grader et al. |
| 4,599,166 A | 7/1986 | Gesslauer |
| 4,650,573 A | 3/1987 | Nathanson |
| 4,955,535 A | 9/1990 | Tsutsui et al. |
| 4,971,687 A | 11/1990 | Anderson |
| 5,103,856 A | 4/1992 | Fleischmann |
| 5,173,178 A | 12/1992 | Kawashima et al. |
| 5,199,639 A | 4/1993 | Kobayashi et al. |
| 5,205,994 A | 4/1993 | Sawamoto et al. |
| 5,354,541 A | 10/1994 | Sali |
| 5,368,815 A | 11/1994 | Kasting, Jr. |
| 5,405,631 A | 4/1995 | Rosenthal |
| 5,460,705 A | 10/1995 | Murphy et al. |
| 5,503,890 A | 4/1996 | Jung |
| 5,566,702 A | 10/1996 | Philipp |
| 5,578,280 A | 11/1996 | Kazi et al. |
| 5,635,059 A | 6/1997 | Johnson |
| 5,670,094 A | 9/1997 | Sasaki |
| 5,680,658 A | 10/1997 | Ho |
| 5,728,287 A | 3/1998 | Hough et al. |
| 5,766,462 A | 6/1998 | Jones |
| 5,793,653 A | 8/1998 | Segal |
| 5,803,139 A | 9/1998 | Kennedy |
| 5,807,473 A | 9/1998 | Sadler et al. |
| 5,824,274 A | 10/1998 | Long |
| 5,843,291 A | 12/1998 | Eki et al. |
| 5,843,307 A | 12/1998 | Faivre et al. |
| 5,853,562 A | 12/1998 | Eki et al. |
| 5,858,201 A | 1/1999 | Otsuka et al. |
| 5,858,215 A | 1/1999 | Burchard et al. |
| 5,858,435 A | 1/1999 | Gallo |
| 5,868,311 A | 2/1999 | Cretu-Petra |
| 5,871,701 A | 2/1999 | Long |
| 5,900,143 A | 5/1999 | Dalton et al. |
| 5,911,870 A | 6/1999 | Hough |
| 5,932,171 A | 8/1999 | Malchesky |
| 5,939,030 A | 8/1999 | Moxley |
| 5,945,068 A | 8/1999 | Ferone |
| 5,948,374 A | 9/1999 | Kuzumoto |
| 5,961,920 A | 10/1999 | Soremark |
| 5,979,500 A | 11/1999 | Jahrling et al. |
| 5,985,108 A | 11/1999 | Arai |
| 5,989,407 A | 11/1999 | Andrews |
| 5,992,431 A | 11/1999 | Weber et al. |
| 6,019,950 A | 2/2000 | Lai |
| 6,024,882 A | 2/2000 | McNeilly et al. |
| 6,030,586 A | 2/2000 | Kuan |
| 6,039,884 A | 3/2000 | Burris |
| 6,086,833 A | 7/2000 | Conners |
| 6,110,292 A | 8/2000 | Jewett et al. |
| 6,132,629 A | 10/2000 | Boley |
| 6,135,146 A | 10/2000 | Koganezawa |
| 6,153,151 A | 11/2000 | Moxley |
| 6,171,469 B1 | 1/2001 | Hough et al. |
| 6,217,833 B1 | 4/2001 | Kolu |
| 6,231,769 B1 | 5/2001 | Pean |
| 6,236,953 B1 | 5/2001 | Segal |
| 6,245,229 B1 | 6/2001 | Kool et al. |
| 6,251,172 B1 | 6/2001 | Conrad |
| 6,319,390 B1 | 11/2001 | Kono |
| 6,328,044 B1 | 12/2001 | Crisinel |
| 6,357,727 B1 | 3/2002 | Cho |
| 6,365,026 B1 | 4/2002 | Andrews |
| 6,368,503 B1 | 4/2002 | Williamson et al. |
| 6,375,038 B1 | 4/2002 | Daansen et al. |
| 6,391,191 B2 | 5/2002 | Conrad |
| 6,392,546 B1 | 5/2002 | Smith |
| 6,419,831 B2 | 7/2002 | Wang |
| 6,428,710 B1 | 8/2002 | Kempen et al. |
| 6,431,189 B1 | 8/2002 | Deibert |
| 6,455,017 B1 | 9/2002 | Kasting, Jr. |
| 6,458,257 B1 | 10/2002 | Andrews et al. |
| 6,461,487 B1 | 10/2002 | Andrews |
| 6,482,370 B2 | 11/2002 | Holsclaw et al. |
| 6,491,879 B2 | 12/2002 | Conrad |
| 6,506,309 B1 | 1/2003 | Daniels et al. |
| 6,521,194 B2 | 2/2003 | Yeh |
| 6,523,193 B2 | 2/2003 | Saraya |
| 6,551,490 B2 | 4/2003 | Andrews et al. |
| 6,576,096 B1 | 6/2003 | Andrews |
| 6,581,215 B1 | 6/2003 | Tai |
| 6,585,867 B1 | 7/2003 | Asano |
| 6,595,440 B2 | 7/2003 | Moriarty et al. |
| 6,638,364 B2 | 10/2003 | Harkins et al. |
| 6,645,874 B1 | 11/2003 | Torek et al. |
| 6,652,816 B2 | 11/2003 | Hwang |
| 6,673,248 B2 | 1/2004 | Chowdbury |
| 6,712,951 B2 | 3/2004 | Andrews |
| 6,723,233 B1 | 4/2004 | Barnes |
| 6,727,818 B1 | 4/2004 | Wildman et al. |
| 6,738,996 B1 | 5/2004 | Malek et al. |
| 6,746,580 B2 | 6/2004 | Andrews |
| 6,757,921 B2 | 7/2004 | Esche |
| 6,797,156 B2 | 9/2004 | Chau |
| 6,800,206 B2 | 10/2004 | Robinson |
| 6,808,637 B2 | 10/2004 | Cho |
| 6,814,876 B1 | 11/2004 | Neal |
| 6,821,443 B2 | 11/2004 | Kim |
| 6,860,976 B2 | 3/2005 | Andrews et al. |
| 6,866,806 B2 | 3/2005 | Andrews et al. |
| 6,874,535 B2 | 4/2005 | Parsons et al. |
| 6,882,278 B2 | 4/2005 | Winings et al. |
| 6,964,739 B2 | 11/2005 | Boyd |
| 6,970,574 B1 | 11/2005 | Johnson |
| 6,982,006 B1 | 1/2006 | Boyers et al. |
| 6,984,295 B2 | 1/2006 | Shiue |
| 7,008,523 B2 | 3/2006 | Herrington |
| 7,008,592 B2 | 3/2006 | Sias et al. |
| 7,022,225 B1 | 4/2006 | Clawson et al. |
| 7,029,637 B2 | 4/2006 | Hogarth |
| 7,070,125 B2 | 7/2006 | Williams et al. |
| 7,086,407 B2 | 8/2006 | Lynn |
| 7,087,123 B2 | 8/2006 | Lynn |
| 7,087,124 B2 | 8/2006 | Lynn |
| 7,135,108 B1 | 11/2006 | Barnes |
| 7,150,293 B2 | 12/2006 | Jonte |
| 7,188,632 B2 | 3/2007 | Lynn |
| 7,228,874 B2 | 6/2007 | Bolderheij et al. |
| 7,238,278 B2 | 7/2007 | Coffey et al. |
| 7,244,354 B2 | 7/2007 | Burris |
| 7,275,551 B2 | 10/2007 | Kanaya |
| 7,278,434 B2 | 10/2007 | Huang |
| 7,314,600 B2 | 1/2008 | Matsuzaki |
| 7,322,535 B2 | 1/2008 | Erdely |
| 7,422,684 B1 | 9/2008 | Davis et al. |
| 7,449,090 B2 | 11/2008 | Andrews et al. |
| 7,464,418 B2 | 12/2008 | Seggio et al. |
| 7,488,419 B1 | 2/2009 | Wang |
| 7,494,074 B2 | 2/2009 | Berstead |
| 7,524,466 B2 | 4/2009 | Long |
| 7,531,710 B2 | 5/2009 | Carson et al. |
| 7,537,023 B2 | 5/2009 | Marty et al. |
| 7,542,586 B2 | 6/2009 | Johnson |
| 7,566,387 B2 | 7/2009 | Nam |
| 7,604,735 B1 | 10/2009 | Barnes |
| 7,605,704 B2 | 10/2009 | Munro et al. |
| 7,607,443 B2 | 10/2009 | Barnhill et al. |
| 7,631,372 B2 | 12/2009 | Marty et al. |
| 7,659,824 B2 | 2/2010 | Prodanovich et al. |
| 7,662,293 B2 | 2/2010 | Brolin et al. |

(56) References Cited

U.S. PATENT DOCUMENTS

| | | |
|---|---|---|
| 7,682,464 B2 | 3/2010 | Glenn et al. |
| 7,690,395 B2 | 4/2010 | Jonte et al. |
| 7,708,958 B2 | 5/2010 | Namespetra |
| 7,753,074 B2 | 7/2010 | Rosko et al. |
| 7,767,095 B2 | 8/2010 | Phillips et al. |
| 7,767,168 B2 | 8/2010 | Namespetra et al. |
| 7,768,146 B2 | 8/2010 | Balzano |
| 7,818,083 B2 | 10/2010 | Glenn et al. |
| 7,819,136 B1 | 10/2010 | Eddy |
| 7,850,098 B2 | 12/2010 | Vogel et al. |
| 7,875,173 B1 | 1/2011 | Barnes |
| 7,909,269 B2 | 3/2011 | Erickson et al. |
| 7,922,668 B2 | 4/2011 | Rimdzius |
| 7,922,890 B2 | 4/2011 | Sanchez et al. |
| 7,931,813 B2 | 4/2011 | Asokan et al. |
| 7,932,618 B2 | 4/2011 | Baarman et al. |
| 7,956,480 B2 | 6/2011 | Onodera et al. |
| 7,956,481 B2 | 6/2011 | Baarman et al. |
| 7,967,800 B2 | 6/2011 | Chewins |
| 7,997,301 B2 | 8/2011 | Marty et al. |
| 8,007,666 B1 | 8/2011 | Davis et al. |
| 8,029,726 B2 | 10/2011 | Resch et al. |
| 8,085,155 B2 | 12/2011 | Prodanovich et al. |
| 8,099,802 B2 | 1/2012 | Yamaguchi et al. |
| 8,110,047 B2 | 2/2012 | Glenn et al. |
| 8,127,782 B2 | 3/2012 | Jonte et al. |
| 8,152,142 B2 | 4/2012 | Hirakui |
| 8,249,295 B2 | 8/2012 | Johnson |
| 8,276,603 B2 | 10/2012 | Berklund et al. |
| 8,294,585 B2 | 10/2012 | Barnhill |
| 8,343,341 B2 | 1/2013 | Davis |
| 8,361,289 B2 | 1/2013 | Whitehead et al. |
| 8,377,229 B2 | 2/2013 | Barnhill et al. |
| 8,400,309 B2 | 3/2013 | Glenn et al. |
| 8,431,006 B2 | 4/2013 | Arihara et al. |
| 8,525,666 B2 | 9/2013 | Melker et al. |
| 8,528,579 B2 | 9/2013 | Jonte et al. |
| 8,545,695 B2 | 10/2013 | Chen et al. |
| 8,734,626 B2 | 5/2014 | Arihara et al. |
| 8,742,932 B2 | 6/2014 | Casarcs |
| 8,844,564 B2 | 9/2014 | Jonte et al. |
| 8,932,408 B2 | 1/2015 | Sellmer |
| 8,951,477 B2 | 2/2015 | Russell et al. |
| 8,980,079 B2 | 3/2015 | Yost, III et al. |
| 8,999,261 B2 | 4/2015 | Benedetto |
| 9,174,845 B2 | 11/2015 | Lynn |
| 9,303,394 B2 | 4/2016 | Mock et al. |
| 9,340,918 B2 | 5/2016 | Lv et al. |
| 2001/0040133 A1 | 11/2001 | Wang |
| 2002/0019709 A1 | 2/2002 | Segal |
| 2002/0040867 A1 | 4/2002 | Conrad |
| 2002/0048539 A1 | 4/2002 | Mackay |
| 2002/0060189 A1 | 5/2002 | Conrad |
| 2002/0071795 A1 | 6/2002 | Jensen |
| 2002/0130091 A1 | 9/2002 | Ekberg et al. |
| 2002/0134736 A1 | 9/2002 | Burris et al. |
| 2002/0146357 A1 | 10/2002 | Yeh |
| 2003/0080467 A1 | 5/2003 | Andrews et al. |
| 2003/0099584 A1 | 5/2003 | Diang |
| 2003/0108460 A1 | 6/2003 | Andreev et al. |
| 2003/0226751 A1 | 12/2003 | Kasten |
| 2004/0065623 A1 | 4/2004 | Lee |
| 2004/0140269 A1 | 7/2004 | Chang |
| 2005/0000911 A1 | 1/2005 | Thorpe |
| 2005/0103722 A1 | 5/2005 | Freydina et al. |
| 2005/0199484 A1 | 9/2005 | Olstowski |
| 2005/0214182 A1 | 9/2005 | Lu |
| 2005/0279686 A1 | 12/2005 | Hsu |
| 2006/0021923 A1 | 2/2006 | Lin |
| 2006/0051259 A1 | 3/2006 | Chiu |
| 2006/0078661 A1 | 4/2006 | Wang |
| 2006/0053546 A1 | 5/2006 | Gioodt |
| 2006/0108293 A1 | 5/2006 | Brolin et al. |
| 2006/0130907 A1 | 6/2006 | Marty et al. |
| 2006/0151803 A1 | 7/2006 | Wesner et al. |
| 2006/0163169 A1 | 7/2006 | Eckhardt |
| 2006/0186215 A1 | 8/2006 | Logan |
| 2006/0266683 A1 | 11/2006 | Sung |
| 2007/0020212 A1 | 1/2007 | Bernal et al. |
| 2007/0028975 A1 | 2/2007 | Herring et al. |
| 2007/0108135 A1 | 5/2007 | Davis |
| 2007/0125230 A1 | 6/2007 | Powell et al. |
| 2007/0154364 A1 | 7/2007 | Tseng |
| 2007/0204925 A1 | 9/2007 | Bolderheij |
| 2007/0235065 A1 | 10/2007 | Lin |
| 2007/0246564 A1 | 10/2007 | Rodenbeck et al. |
| 2008/0023411 A1 | 1/2008 | Liou |
| 2008/0035580 A1 | 2/2008 | de Rijk |
| 2008/0039176 A1 | 2/2008 | Okada |
| 2008/0067078 A1 | 3/2008 | Kitaori et al. |
| 2008/0105764 A1 | 5/2008 | Jianglin et al. |
| 2008/0156642 A1 | 7/2008 | Fryda et al. |
| 2008/0181832 A1 | 7/2008 | Shiue et al. |
| 2008/0202994 A1 | 8/2008 | Hsu et al. |
| 2008/0203195 A1 | 8/2008 | Schmitt |
| 2008/0237368 A1 | 10/2008 | Hengsperger |
| 2008/0251373 A1 | 10/2008 | Oke |
| 2008/0267840 A1 | 10/2008 | Yeh |
| 2008/0271238 A1 | 11/2008 | Reeder et al. |
| 2009/0039032 A1 | 2/2009 | Patera et al. |
| 2009/0039176 A1 | 2/2009 | Davidson et al. |
| 2009/0113619 A1 | 5/2009 | Tichenor |
| 2009/0114605 A1 | 5/2009 | Salama et al. |
| 2009/0202396 A1 | 8/2009 | Long |
| 2009/0266383 A1 | 10/2009 | Wang |
| 2009/0269240 A1 | 10/2009 | Tanaka |
| 2009/0271238 A1 | 11/2009 | Reeder et al. |
| 2009/0273477 A1 | 11/2009 | Barnhill |
| 2009/0301865 A1 | 12/2009 | Yoshida et al. |
| 2010/0001418 A1 | 1/2010 | Hirakui |
| 2010/0006450 A1* | 1/2010 | Whitehead ......... C02F 1/46109 205/742 |
| 2010/0018927 A1 | 1/2010 | Poole |
| 2010/0021598 A1 | 1/2010 | Lynn |
| 2010/0089765 A1 | 4/2010 | Arihara et al. |
| 2010/0100242 A1 | 4/2010 | Frank |
| 2010/0116369 A1 | 5/2010 | Lautzenheiser et al. |
| 2010/0119670 A1 | 5/2010 | Mazzariello |
| 2010/0139779 A1 | 6/2010 | Lautzenheiser et al. |
| 2010/0143201 A1 | 6/2010 | Long |
| 2010/0170570 A1 | 7/2010 | Rodenbeck et al. |
| 2010/0192987 A1 | 8/2010 | Steffen |
| 2010/0193977 A1 | 8/2010 | Yamamoto et al. |
| 2010/0252415 A1 | 10/2010 | Lynn |
| 2010/0320082 A1 | 12/2010 | Kato et al. |
| 2011/0030823 A1 | 2/2011 | Seal et al. |
| 2011/0036761 A1 | 2/2011 | Chen et al. |
| 2011/0068060 A1 | 3/2011 | Batten |
| 2011/0079519 A1 | 4/2011 | Widler et al. |
| 2011/0175351 A1 | 7/2011 | Baarman et al. |
| 2011/0253220 A1 | 10/2011 | Sawaski et al. |
| 2011/0256027 A1 | 10/2011 | Chen et al. |
| 2011/0316703 A1 | 12/2011 | Butler et al. |
| 2011/0320134 A1 | 12/2011 | Butler et al. |
| 2012/0138478 A1 | 6/2012 | Yost, III et al. |
| 2012/0167926 A1 | 7/2012 | Nakamura |
| 2012/0216828 A1 | 8/2012 | Tanaka et al. |
| 2012/0266983 A1 | 10/2012 | Tsai et al. |
| 2013/0136669 A1 | 5/2013 | Feldain et al. |
| 2013/0146516 A1 | 6/2013 | Chen et al. |
| 2013/0206654 A1 | 8/2013 | Lutz et al. |
| 2013/0269733 A1 | 10/2013 | Chakrabortty et al. |
| 2014/0000733 A1 | 1/2014 | Jonte et al. |
| 2014/0076724 A1 | 3/2014 | Cheng et al. |
| 2014/0251795 A1 | 9/2014 | Chen et al. |
| 2014/0255257 A1 | 9/2014 | Pawlow |
| 2014/0322096 A1 | 10/2014 | Pelfrey et al. |
| 2014/0352799 A1 | 12/2014 | Rosko et al. |
| 2015/0059085 A1 | 3/2015 | Seibt |
| 2015/0157754 A1 | 6/2015 | Rutter et al. |
| 2015/0191381 A1 | 7/2015 | Wang |
| 2015/0197432 A1 | 7/2015 | Widler et al. |
| 2015/0308084 A1 | 10/2015 | Thompson et al. |

(56) References Cited

U.S. PATENT DOCUMENTS

| | | |
|---|---|---|
| 2015/0376804 A1 | 12/2015 | Gorokhovsky et al. |
| 2016/0220714 A1 | 8/2016 | Weltmann et al. |
| 2017/0137953 A1 | 5/2017 | Jonte et al. |

FOREIGN PATENT DOCUMENTS

| | | |
|---|---|---|
| CN | 1675435 | 9/2005 |
| CN | 1809655 A | 7/2006 |
| CN | 101137797 | 3/2008 |
| CN | 101448744 | 6/2009 |
| CN | 101509576 | 8/2009 |
| CN | 102671559 | 9/2012 |
| CN | 103328690 | 9/2013 |
| CN | 103987664 | 8/2014 |
| EP | 0 544 744 | 6/1991 |
| EP | 1149054 | 3/2003 |
| EP | 1841924 | 10/2007 |
| JP | 6306666 A | 11/1994 |
| JP | 7060265 | 3/1995 |
| JP | 7290073 | 11/1995 |
| JP | 8071566 | 3/1996 |
| JP | 8108017 | 4/1996 |
| JP | 8281281 | 10/1996 |
| JP | 9075958 | 3/1997 |
| JP | 10005148 | 1/1998 |
| JP | 10219786 | 8/1998 |
| JP | 10328274 | 12/1998 |
| JP | 11009481 | 1/1999 |
| JP | 11021960 | 1/1999 |
| JP | 11036394 | 2/1999 |
| JP | 11047773 | 2/1999 |
| JP | 11047774 | 2/1999 |
| JP | 11140929 | 5/1999 |
| JP | 11157808 | 6/1999 |
| JP | 11236692 | 8/1999 |
| JP | 11247258 | 9/1999 |
| JP | 2000197891 | 7/2000 |
| JP | 2000317474 | 11/2000 |
| JP | 2001040731 | 2/2001 |
| JP | 2001070770 | 3/2001 |
| JP | 2001205059 | 7/2001 |
| JP | 2001276666 | 10/2001 |
| JP | 2002052327 | 2/2002 |
| JP | 2002126481 | 5/2002 |
| JP | 2002331233 | 11/2002 |
| JP | 2003135944 | 5/2003 |
| JP | 2003247255 | 9/2003 |
| JP | 2003320278 | 11/2003 |
| JP | 2004084445 | 3/2004 |
| JP | 2004324190 | 11/2004 |
| JP | 2005021718 | 1/2005 |
| JP | 2005124797 | 5/2005 |
| JP | 2005131489 | 5/2005 |
| JP | 2005169297 | 6/2005 |
| JP | 2006136862 | 6/2006 |
| JP | 2007111689 | 5/2007 |
| JP | 2007236706 | 9/2007 |
| JP | 2008000666 | 1/2008 |
| JP | 2008018327 | 1/2008 |
| JP | 2008086960 | 4/2008 |
| JP | 2008229491 | 10/2008 |
| JP | 2009189279 | 8/2009 |
| JP | 2009209378 | 9/2009 |
| JP | 2010090586 | 4/2010 |
| JP | 2010150630 | 7/2010 |
| JP | 2011004990 | 1/2011 |
| KR | 199614038 | 10/1996 |
| KR | 2009027908 | 3/2009 |
| KR | 2009030783 | 3/2009 |
| KR | 20090086962 | 8/2009 |
| KR | 1026415 | 4/2011 |
| TW | 586920 | 5/2004 |
| TW | 200516060 | 2/2005 |
| TW | M270172 | 7/2005 |
| TW | M323278 | 12/2007 |
| TW | 201117887 | 6/2011 |
| TW | 201350624 | 12/2013 |
| WO | WO 98/16473 | 4/1998 |
| WO | WO 1999012084 | 3/1999 |
| WO | WO 00/35813 | 6/2000 |
| WO | WO 0133529 | 5/2001 |
| WO | WO 2002014226 | 2/2002 |
| WO | WO 2002021475 | 3/2002 |
| WO | WO 03/040032 | 5/2003 |
| WO | WO 03/068375 | 8/2003 |
| WO | WO 2003079278 | 9/2003 |
| WO | WO 2003033402 | 11/2003 |
| WO | WO 2004/033376 | 4/2004 |
| WO | WO 2005/054545 | 6/2005 |
| WO | WO 2006076149 | 7/2006 |
| WO | WO 2006/096991 | 9/2006 |
| WO | WO 2008044262 | 4/2008 |
| WO | WO 2009028845 | 3/2009 |
| WO | WO 2010/011887 | 1/2010 |
| WO | WO 2010/099397 | 9/2010 |
| WO | WO 2010/104564 | 9/2010 |
| WO | WO 2011/144285 | 11/2011 |
| WO | 2012075425 | 6/2012 |
| WO | WO 2013/045508 | 4/2013 |
| WO | WO 2013/086217 | 6/2013 |
| WO | WO 2014/113699 | 7/2014 |
| WO | WO 2016/112922 | 6/2016 |
| WO | WO 2017/011506 | 1/2017 |

OTHER PUBLICATIONS

Ozone Boy, www.cleanwaterstore.com/OS001630-p-ozone-faucet.html; Jun. 11, 2012.

Medi-Flo, Sink, available at www.franke-commercial.com, available at least as early as Nov. 27, 2015, 1 page.

International Search Report and Written Opinion for PCT/US2016/42001 dated Sep. 27, 2016, 8 pgs.

* cited by examiner

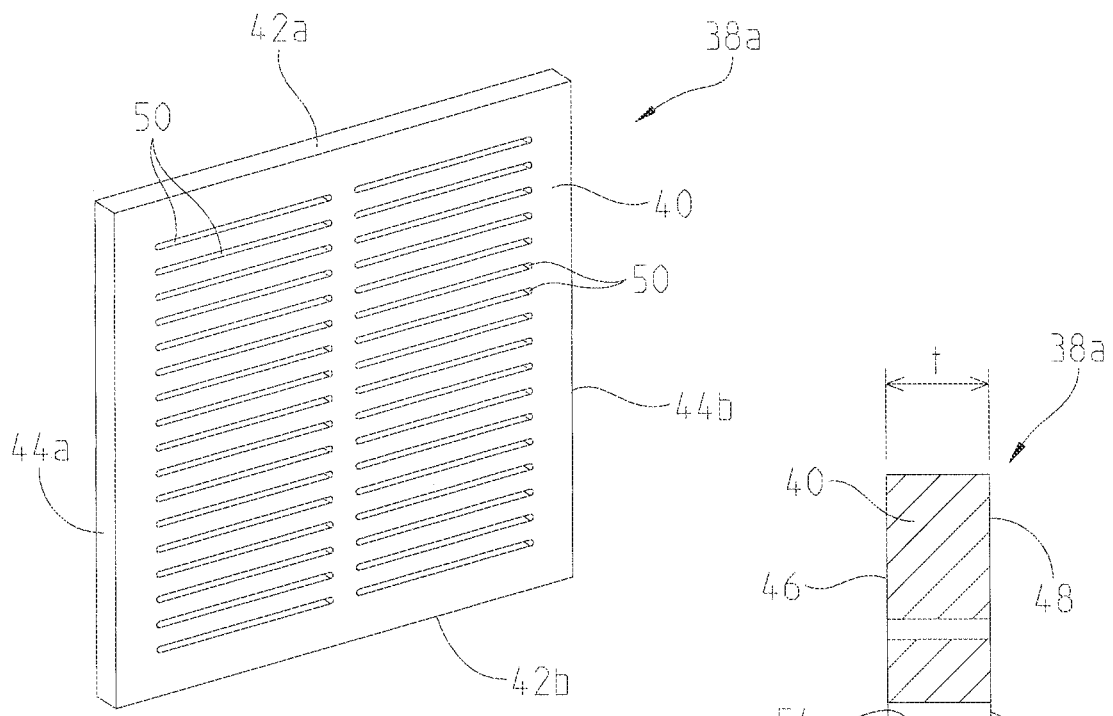
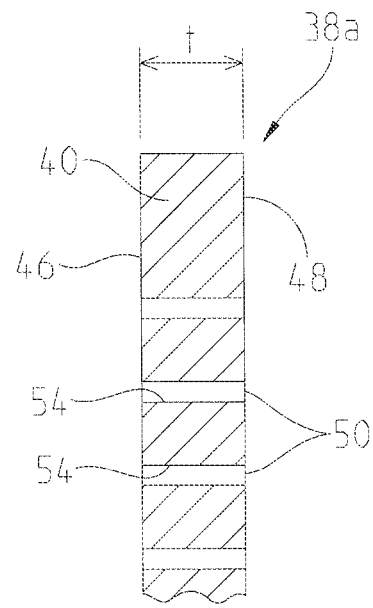
Fig. 3A
Fig. 3C
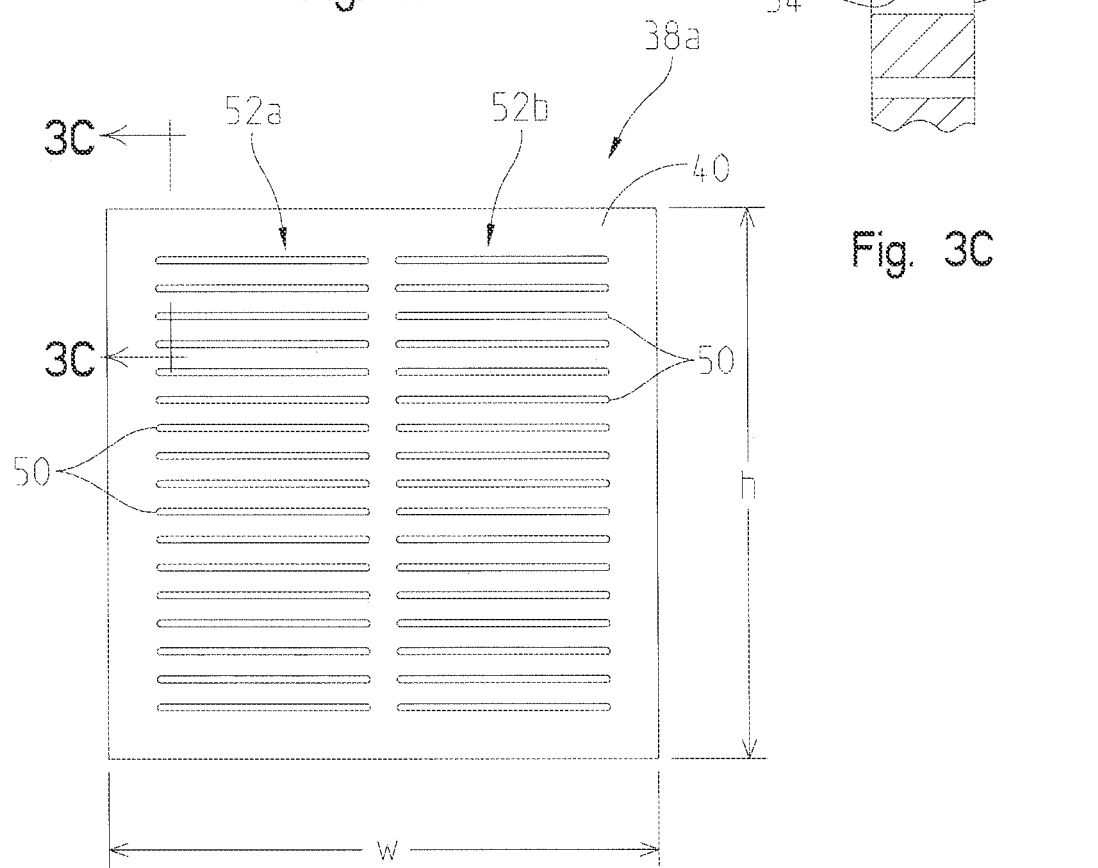
Fig. 3B

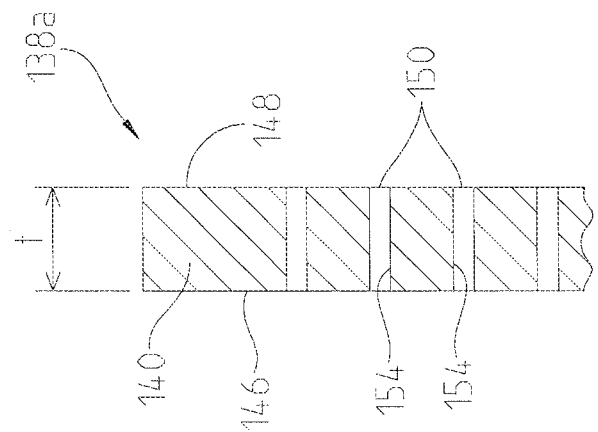
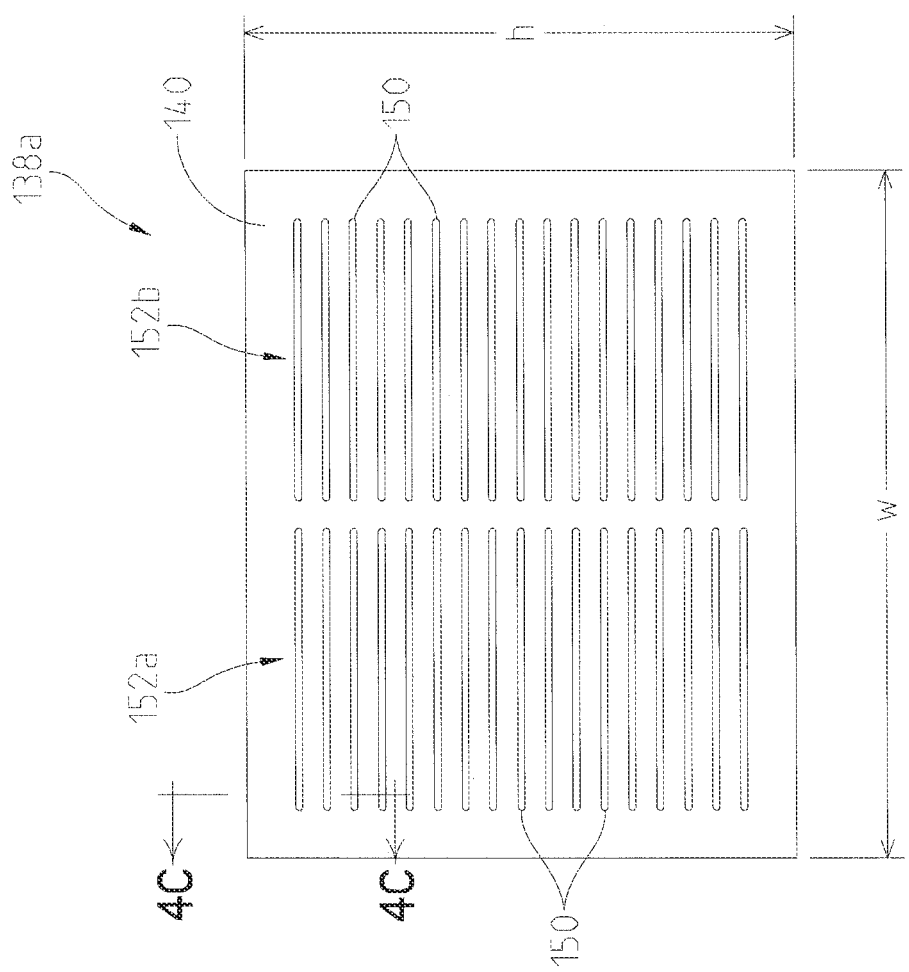
Fig. 4C
Fig. 4B

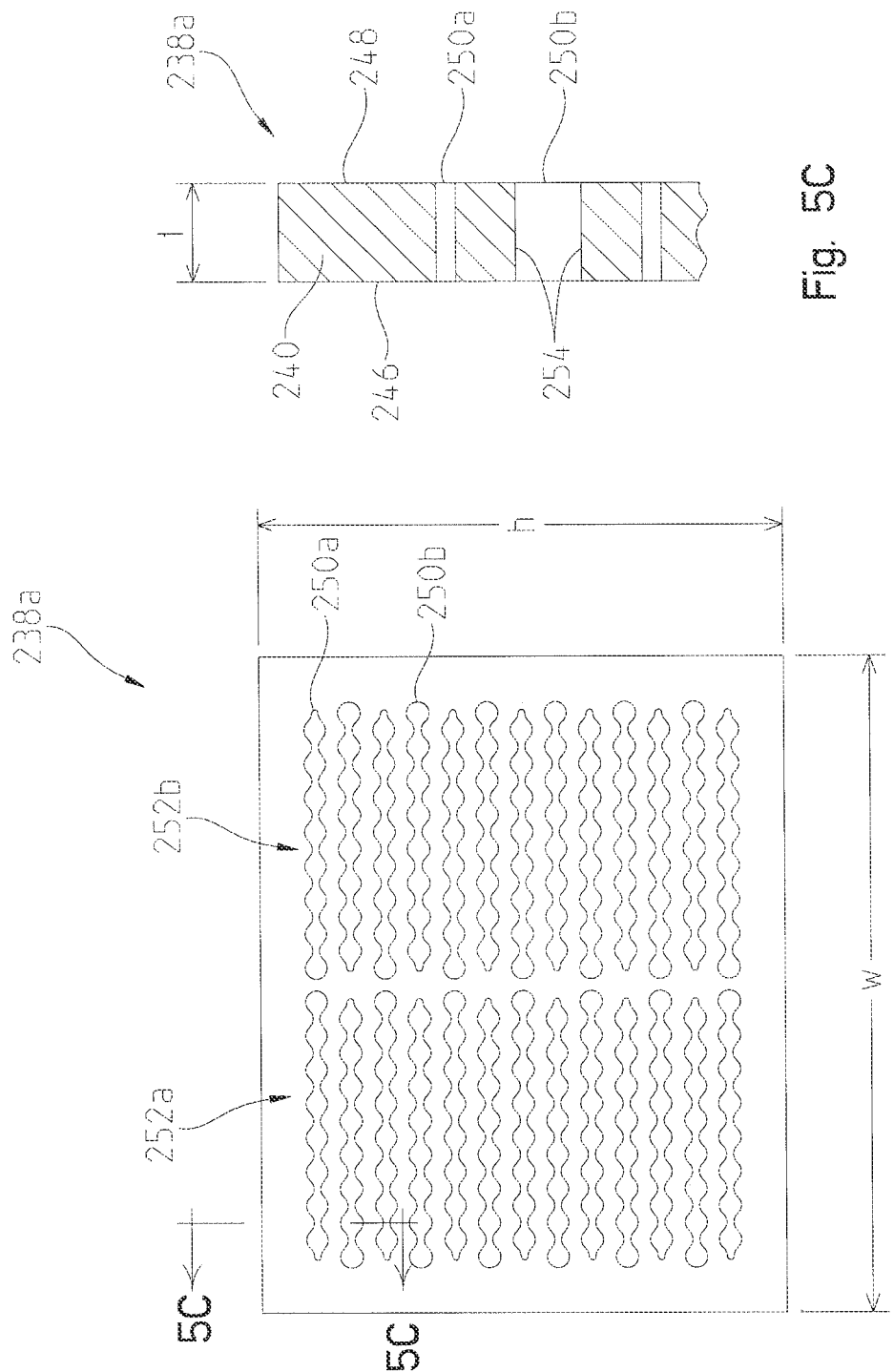

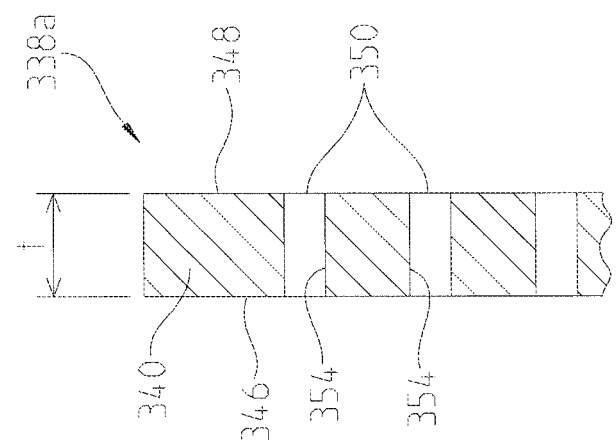
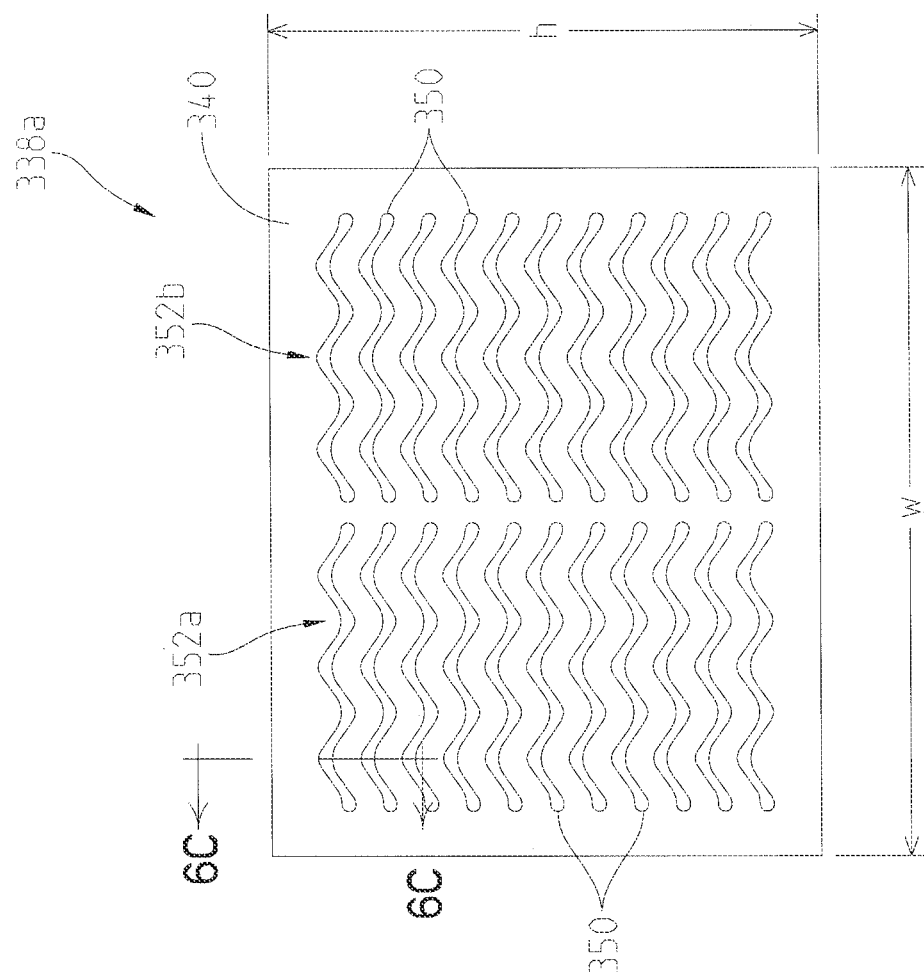

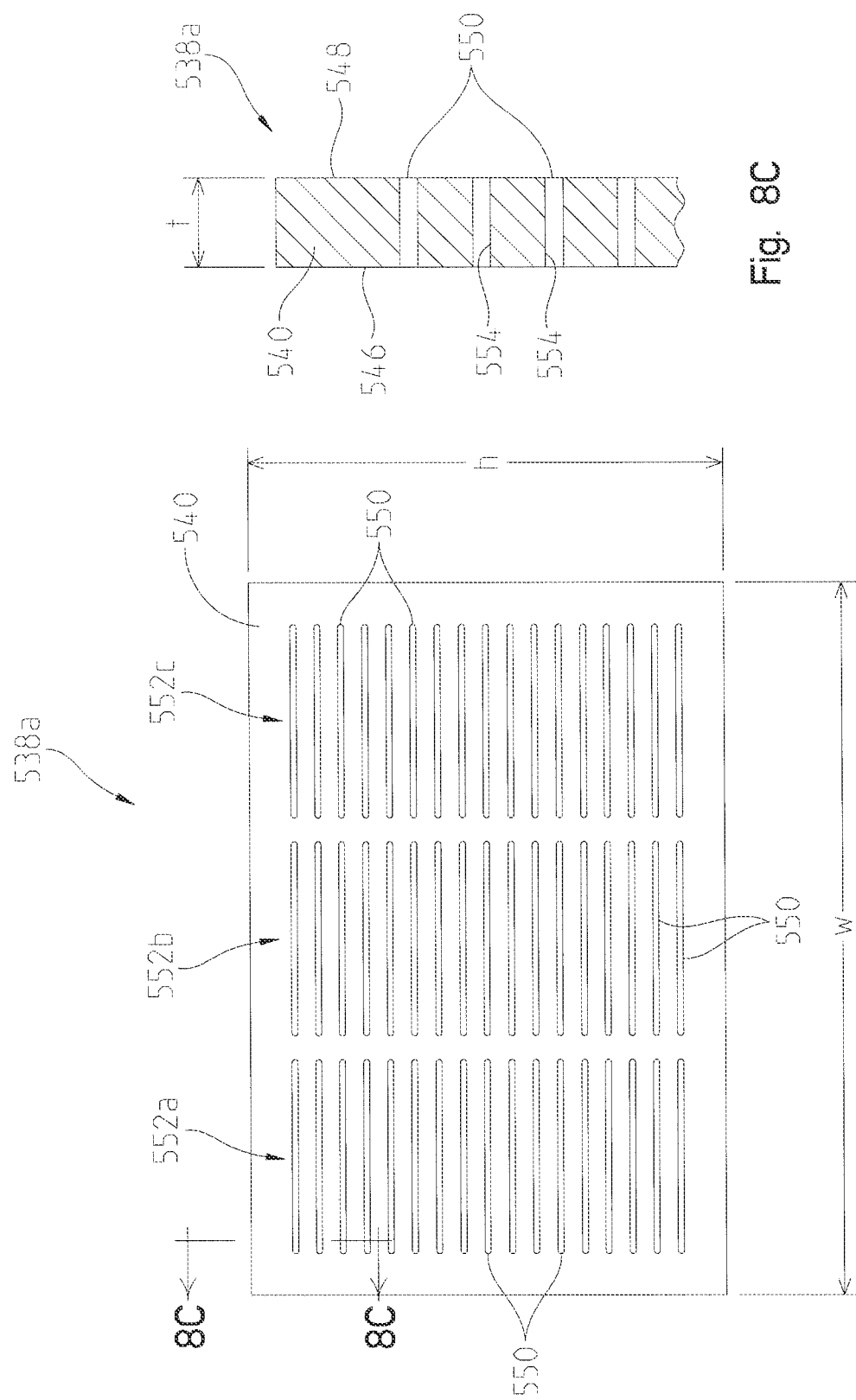

| | Overall Height (h) | Overall Length (l) | Gross Surface Area | Aperture Opening Surface Area | Aperture Gross Surface Utilization | Surface Area Tangent Surface Area | Aperture Active Surface Area (300um Critical Offset Band) | Exterior Active Surface Area (300um Critical Offset Band) | Total Active Surface Area (300um Critical Offset Band) | Active Tangent Surface Utilization | Active Gross Surface Utilization | Aperture Edge Perimeter | Perimeter Exterior Edge Perimeter | Total Edge Perimeter | Perimeter Aperture Ratio | Offset Average Offset Band | Density Active Surface Area Current Density |
|---|---|---|---|---|---|---|---|---|---|---|---|---|---|---|---|---|---|
| | mm | mm | mm^2 | mm^2 | % | mm^2 | mm^2 | mm^2 | mm^2 | % | % | mm | mm | mm | mm/mm^2 | mm | A/cm^2 |
| Fine 8x8 (38) (FIGS. 3A-3D) | 8 | 8 | 64 | 10.5 | 83.6% | 53.5 | 41.0 | 9.2 | 50.2 | 93.8% | 78.45% | 215 | 32.0 | 247 | 23.5 | 0.204 | 1.99 |
| Fine 8x10 (138) (FIGS. 4A-4D) | 8 | 10 | 80 | 13.9 | 82.7% | 66.1 | 52.0 | 10.4 | 62.4 | 94.4% | 78.01% | 283 | 36.0 | 319 | 23.0 | 0.196 | 1.60 |
| Knotted 8x10 (238) (FIGS. 5A-5D) | 8 | 10 | 80 | 23.5 | 70.6% | 56.5 | 41.4 | 10.4 | 51.9 | 91.8% | 64.85% | 248 | 36.0 | 284 | 12.1 | 0.183 | 1.93 |
| Serpentine 8x10 (338) (FIGS. 6A-6D) | 8 | 10 | 80 | 15.8 | 80.3% | 64.2 | 48.0 | 10.4 | 58.4 | 91.0% | 73.02% | 214 | 36.0 | 250 | 15.8 | 0.233 | 1.71 |
| Sparse 8x10 Current (438) (FIGS. FIGS. 7A-7D) | 8 | 10 | 80 | 9.4 | 88.3% | 70.6 | 57.2 | 10.4 | 67.7 | 95.8% | 84.57% | 183 | 36.0 | 219 | 23.4 | 0.309 | 1.48 |
| Sparse 8x10 Ideal (438) (FIGS. FIGS. 7A-7D) | 8 | 10 | 80 | 9.4 | 88.3% | 70.6 | 60.1 | 10.4 | 70.5 | 99.8% | 88.15% | 191 | 36.0 | 227 | 24.2 | 0.311 | 1.42 |
| Sparse 8x10 Extreme (438) (FIGS. FIGS. 7A-7D) | 8 | 10 | 80 | 4.9 | 93.9% | 75.1 | 33.8 | 10.4 | 44.3 | 58.9% | 55.35% | 100 | 36.0 | 136 | 27.8 | 0.327 | 2.26 |
| Fine 8x12 (538) (FIGS. 8A-8D) | 8 | 12 | 96 | 16.6 | 82.8% | 79.5 | 63.6 | 11.6 | 75.3 | 94.8% | 78.43% | 339 | 40.0 | 379 | 22.9 | 0.199 | 1.33 |
| Sparse 8x12 (638) (FIGS. 9A-9D) | 8 | 12 | 96 | 10.7 | 88.8% | 85.3 | 70.0 | 11.6 | 81.7 | 95.8% | 85.09% | 219 | 40.0 | 259 | 24.2 | 0.315 | 1.22 |
| EO 5x15 (738) (FIGS. 10A-10D) | 5 | 15 | 75 | 24.7 | 67.1% | 50.3 | 32.3 | 11.5 | 43.8 | 87.0% | 58.39% | 268 | 40.0 | 308 | 12.5 | 0.142 | 2.28 |

FIG. 11

|  | Aperture Dimensions | | | | | |
| --- | --- | --- | --- | --- | --- | --- |
|  | Aperture Height (sh) | Aperture Length (sl) | Aperture Centerline Spacing (sd1) | Adjacent Aperture End Spacing (sd2) | Aperture Perimeter Height Spacing (ph) | Aperture Perimeter Width Spacing (pw) |
|  | mm | mm | mm | mm | mm | mm |
| Fine 8x8 (38) (FIGS. 3A-3D) | 0.1 | 3.1 | 0.41 | 0.4 | 0.7 | 0.7 |
| Fine 8x10 (138) (FIGS. 4A-4D) | 0.1 | 4.1 | 0.41 | 0.4 | 0.7 | 0.7 |
| Knotted 8x10 (238) (FIGS. 5A-5D) | 0.1 (sh1) 0.34 (sh2) | 4.06 | 0.53 | 0.18 | 0.68 | 0.69 |
| Serpentine 8x10 (338) (FIGS. 6A-6D) | 0.13 | 4.2 | 0.37 | 0.3 | 0.69 | 0.65 |
| Sparse 8x10 Current (438) (FIGS. 7A-7D) | 0.1 | 4.1 | 0.56 | 0.4 | 0.65 | 0.7 |
| Sparse 8x10 Ideal (438) (FIGS. 7A-7D) | 0.1 | 4.28 | 0.67 | 0.4 | 0.59 | 0.53 |
| Sparse 8x10 Extreme (438) (FIGS. 7A-7D) | 0.1 | 4.25 | 0.58 | 0.4 | 0.49 | 0.55 |
| Fine 8x12 (538) (FIGS. 8A-8D) | 0.1 | 3.27 | 0.41 | 0.4 | 0.7 | 0.7 |
| Sparse 8x12 (638) (FIGS. 9A-9D) | 0.1 | 3.27 | 0.66 | 0.4 | 0.7 | 0.7 |

FIG. 12

ELECTRODE FOR AN OZONE GENERATOR

CROSS-REFERENCE TO RELATED APPLICATIONS

This application is a 371 national phase filing of PCT International Application Serial No. PCT/US2016/042001, filed Jul. 13, 2016, which claims the benefit of U.S. Provisional Patent Application Ser. No. 62/191,741, filed Jul. 13, 2015, the disclosures of which are expressly incorporated herein by reference.

FIELD OF THE DISCLOSURE

The present disclosure relates to electromechanical electrodes used in aqueous ozone generation. More particularly, the present disclosure relates to electrodes used within an ozone generator, and to methods for assembling and using the same.

BACKGROUND AND SUMMARY OF THE DISCLOSURE

An electrolytic ozone generator may produce ozonated water used, for example, for disinfecting purposes. More particularly, ozone is a strong oxidant that is used for water treatment and disinfection. In many applications, ozone replaces chlorine because of unwanted by-product formation connected with the latter. Ozone dissolved in water is used for disinfection of microbes and organic pollutants, wastewater treatment, and the like. The electrochemical production of ozone has advantages over the conventional technologies such as corona discharge. Ozone from electrochemical production is directly dissolved in water; thereby minimizing technical problems associated with handling ozone gas which is toxic at high concentrations.

Electrodes are a primary element used in the operation of the ozone generator. Electrodes used in prior art ozone generators often suffer from inefficiencies or high manufacturing costs due to size, materials of fabrication, and design constraints, such as geometry. Therefore, it would be beneficial to design electrodes to utilize the maximum electrode surface area and produce as much ozone as possible.

During water electrolysis, oxygen evolution is the main rival reaction to ozone production. Thermodynamically, oxygen evolution is strongly favored versus ozone production. Therefore, high current efficiencies for electrochemical ozone production are only possible for anode materials with a high overpotential for oxygen evolution. In the recent years, doped diamond electrodes have been developed and investigated for generation of dissolved ozone. Besides other interesting properties, doped diamond is distinguished by an exceptionally high overvoltage for oxygen evolution in aqueous electrolytes which makes even highly efficient OH radical production possible. In addition, diamond and related materials are stable in aqueous electrolytic processes.

According to an illustrative embodiment of the present disclosure, electrodes for use within an ozone generator include a plurality of plates made from electrically conductive material such as boron doped silicon, glassy carbon or oxidation resistant metals, such as titanium or niobium. In the illustrative embodiment, electrically conductive boron doped silicon is preferred due to its superior chemical resistance under anodic or cathodic operation, and its relatively low cost. Each electrode includes a front surface and a rear surface, the front surface coated with an electro-catalyst such as boron doped diamond, platinum, ruthenium oxide, or indium oxide. In the illustrative embodiment, boron doped diamond is preferred due to its high electro-catalytic activity and oxidation resistance. The electro-catalyst coating is supported by the front surface of the conductive plate, with a plurality of apertures formed within the conductive plate.

A hydrophilic electrolytic separator or membrane is illustratively disposed intermediate the front surfaces of the electrodes, forming the anode and cathode of the electrolytic cell. The separator is solid (i.e., without mating apertures) thus providing a liquid and gas barrier between the anode and cathode electrode apertures and preventing recombination of reactive oxygen and hydrogen species.

Oxygen and hydrogen are created at the anode and cathode respectively due to the electrolysis of water within and near the hydrophilic electrolytic separator. Electrolysis occurs at facing anode and cathode surfaces. Therefore, the electrode outer edges and the plurality of apertures must adjacently align to the mating electrode having substantially identical geometry.

The plurality of apertures in the electrode allows electrolysis products created at the mated surfaces of the electrode and separator to escape and allow the transport of replacement liquid water into the electrolytic separator. Maintaining hydration of the electrolytic separator is essential for ionic conductivity and the production of ozone. As such, careful sizing and placement of the apertures is necessary to maximize the surface area and allow the separator to rehydrate water during water electrolysis.

During electrolysis, rehydration of the separator must occur at or very near the mating exterior edges or aperture edges of the electrode. The summation of these edges of the electrode is collectively called the electrode Total Edge Perimeter. Due to the separator's structure some of the water necessary to rehydrate must enter into the separator near the electrode perimeter edges and travel along the interface between the separator and the electrode. This water can only travel a short distance along the mated surface interface, about 0.3 mm-0.4 mm, which is known as the Critical Offset Band. Therefore, to utilize the maximum surface area of the electrode for electrolysis, the perimeter edges of an electrode should lay within 0.6 mm-0.8 mm of other adjacent perimeter edges on the same electrode face, i.e. spaced 0.6 mm-0.8 mm apart (i.e., two times the 0.3 mm-0.4 mm Critical Offset Band). Distances greater than said Critical Offset Band do not allow sufficient water flow to rehydrate more distant areas of the separator, and therefore have very little electrolytic activity and ozone production.

The electrode surface area that contributes the majority of electrolytic reactions is collectively called the Active Surface Area. A majority of the electrolytic reactions occur at the interface of the separator and electrode as opposed to the Aperture Opening Surface Area or beyond the Exterior Edge Perimeter of the electrode. In order to utilize the electrode's maximum Active Surface Area from the available Tangent Surface Area, the size, shape and spacing of the apertures must be considered.

Gaseous products created during electrolysis are expelled through the apertures. Water necessary to rehydrate the separator is drawn in through the apertures. Apertures subtract from the available Active Surface Area used for electrolytic reactions.

To manufacture an ozone generator at the lowest cost it is advisable to optimize the Active Surface Area Current Density of the electrodes. Minimum electrode size is determined by the ozone generator operating life at maximum Active Surface Area Current Density of the electrolyte and electrode. Commercially existing solid polymer electrolytes generally limit operating current densities to less than about 1.5 amps/cm² for 200 hrs of operation.

It is therefore desired to design electrodes that operate at the maximum Active Surface Area Current Density using the maximum Active Surface Area available from the Tangent Surface Area. The Tangent Surface Area is defined by the surface contact area between the front of the conductive plate and the separator, and represents the maximum possible surface area of the electrode for producing electrochemical reactions. A measure of how well the electrode utilizes the Active Surface Area compared to the Tangent Surface Area is the Active/Tangent Surface Area coefficient defined by the Active Surface Area divided by the Tangent Surface Area. Active/Tangent Surface Area coefficients nearing 100% are ideal.

The Critical Offset Band is defined where maximum electrochemical reactions occur from the Total Edge Perimeter. The Active Surface Area is determined by the numerical integration of non-overlapping Critical Offset Bands along the boundary edges of the front conductive plate. The Total Edge Perimeter is defined by the Outside Edge Perimeter of the front conductive plate summed with the Aperture Edge Perimeter. The Aperture Edge Perimeter is defined by the summation of perimeter edges of the plurality of apertures within the conductive plate. The Outside Edge Perimeter is defined by the total exterior perimeter of the front conductive plate.

An Active/Tangent Surface Utilization coefficient is defined by the Active Surface Area divided by the Tangent Surface Area, wherein said Ideal Offset Band is between 0.3 mm and 0.4 mm. Illustratively, the Active/Tangent Surface Utilization coefficient is at least equal to 90%, and most preferably 100%.

An Active/Gross Surface Utilization coefficient is defined by the Active Surface Area divided by the Gross Surface Area, wherein the Ideal Offset Band is between 0.3 mm and 0.4 mm. Illustratively, the Active/Gross Surface Utilization coefficient is at least equal to 60%, preferably greater than 70%.

A Perimeter/Aperture Ratio is defined by the Total Edge Perimeter divided by the Aperture Opening Surface Area. Illustratively, the Perimeter/Aperture Ratio is greater than 15 20 mm/mm², preferably greater than 20 mm/mm².

An Average Offset Band is defined by the Active Surface Area divided by the Total Edge Perimeter. Illustratively, the Average Offset Band is greater than 0.2 mm and less than 0.4 mm, and most preferably around 0.3 mm.

According to an illustrative embodiment of the present disclosure, an electrode for use within an ozone generator includes a conductive plate having a front surface and a rear surface extending between an outside edge perimeter, and a gross surface area defined by the front surface of the conductive plate within the outside edge perimeter. An electro-catalyst coating is supported by the front surface of the conductive plate. A plurality of apertures are formed within the conductive plate and define an aperture edge perimeter and an aperture opening surface area. A tangent area of the conductive plate is defined by the gross surface area less the aperture opening surface area. A total edge perimeter is defined by the outside edge perimeter of the conductive plate and the aperture edge perimeter of the plurality of apertures. An operative offset band is defined a predetermined distance from the outside edge perimeter and the aperture edge perimeter. An active surface area is defined by the operative offset band within the tangent surface area. An active/tangent surface utilization is defined by the ratio of the active surface area over the tangent surface area, the active/tangent surface utilization being greater than 90%.

According to a further illustrative embodiment of the present disclosure, an electrolytic cell for use within an ozone generator includes a cathode, an anode, and a hydrophilic electrolytic separator positioned intermediate the cathode and the anode. Each of the cathode and the anode includes an electrode having a conductive plate, a plurality of apertures formed within the conductive plate, a tangent surface area, an active surface area, and an active/tangent surface utilization defined by the ratio of the active surface area over the tangent surface area. The active/tangent surface utilization is greater than 90%.

BRIEF DESCRIPTION OF THE DRAWINGS

The above-mentioned and other features and advantages of this disclosure, and the manner of attaining end, will become apparent and the invention itself will be understood by reference to the following description of the embodiments of the invention taken in conjunction with the accompanying drawings, wherein:

FIG. 3A is a perspective view of an illustrative electrode for use in the electrolytic cell assembly of FIG. 2;

FIG. 3B is a front plan view of the illustrative electrode of FIG. 3A;

FIG. 3C is a partial cross-sectional view taken along line 3C-3C of FIG. 3B;

FIG. 4B is a front plan view of the illustrative electrode of FIG. 4A;

FIG. 4C is a partial cross-sectional view taken along line 4C-4C of FIG. 4B;

FIG. 5B is a front plan view of the illustrative electrode of FIG. 5A;

FIG. 5C is a partial cross-sectional view taken along line 5C-5C of FIG. 5B;

FIG. 6B is a front plan view of the illustrative electrode of FIG. 6A;

FIG. 6C is a partial cross-sectional view taken along line 6C-6C of FIG. 6B;

FIG. 8B is a front plan view of the illustrative electrode of FIG. 8A;

FIG. 8C is a partial cross-sectional view taken along line 8C-8C of FIG. 8B;

FIG. 11 is a table of illustrative dimensions of the electrodes of FIGS. 3A-10D; and FIG. 12 is a table of illustrative dimensions of the apertures of the electrodes of FIGS. 3A-9D.

Corresponding reference characters indicate corresponding parts throughout the several views. The exemplification set out herein illustrate exemplary embodiments of the invention and such exemplifications are not to be construed as limiting the scope of the invention in any manner.

DETAILED DESCRIPTION OF THE DRAWINGS

Figure 1:
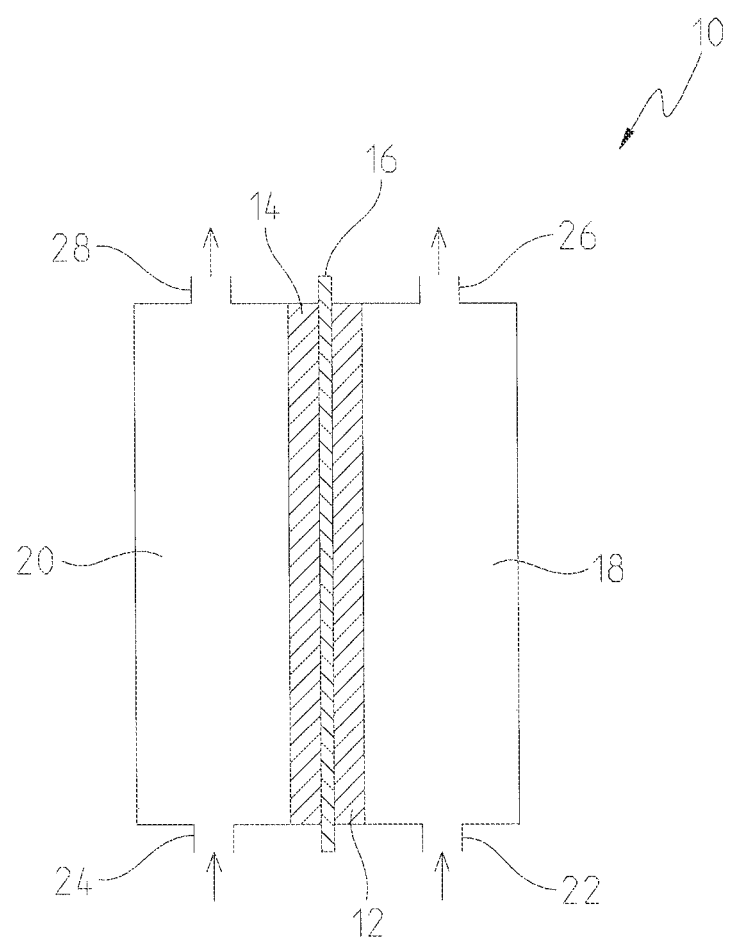
FIG. 1 is a diagrammatic view of an electrolytic cell assembly including electrodes of the present disclosure.

An electrolytic cell assembly 10 for use within an ozone generator is shown diagrammatically in FIG. 1. The illustrative electrolytic cell assembly 10 includes an anode 12 and a cathode 14. An electrolytic separator 16 is disposed intermediate the anode 12 and the cathode 14. As further detailed herein, the anode 12 and the cathode 14 are attached and secured to the electrolytic separator 16. Electrodes 38a and 38b illustratively define the anode 12 and the cathode 14 of the electrolytic cell assembly 10. The anode 12 is positioned within an anode chamber 18, and the cathode 14 is positioned within a cathode chamber 20. The anode chamber 18 and the cathode chamber 20 illustratively include supply ports 22 and 24 for receiving water from a conventional water source, and outlet ports 26 and 28 for discharging water to an outlet.

In operation, electric current is applied to the electrodes 38a, 38b causing electrolysis to occur in the electrolytic cell assembly 10. Specifically, a positive electric potential is applied to one electrode (e.g., the first electrode 38a) to form anode 12, and a negative electric potential is applied to the other electrode (e.g., the second electrode 38b) to form cathode 14. As a result, a voltage differential may be produced across the first electrode 38a and the second electrode 38b. The electric potential may be applied using a power source (not shown). The water flowing through the electrolytic cell assembly 10 may serve as the electrolytic solution without the need for an additional electrolytic solution.

At the positive anode 12 (e.g., the first electrode 38a), the water is electrolyzed and broken down into oxygen ions and hydrogen ions. At least some of the oxygen ions are converted to ozone ($O_3$) due to the higher over-potential voltage of a conductive coating on the anode 12. The ozone may dissolve into the water to perform a disinfecting function in the water. The remaining oxygen ions may be converted to more stable oxygen ($O_2$), which may have little value in this application. Electrons from the electrolyzed water are transported to the cathode 14 (e.g., the second electrode 38b), while hydrogen ions (i.e., protons) from the electrolyzed water are transported to the cathode 14 across the separator 16. At the cathode 14, the hydrogen ions and the electrons from the electrolyzed water recombine to form hydrogen ($H_2$) bubbles. The water streams passing over the electrodes 38a, 38b sweep away the $O_3$ and $O_2$ from the anode 12 and the $H_2$ from the cathode 14. The same water streams also supply fresh water to replenish the water consumed during electrolysis.

Figure 2:
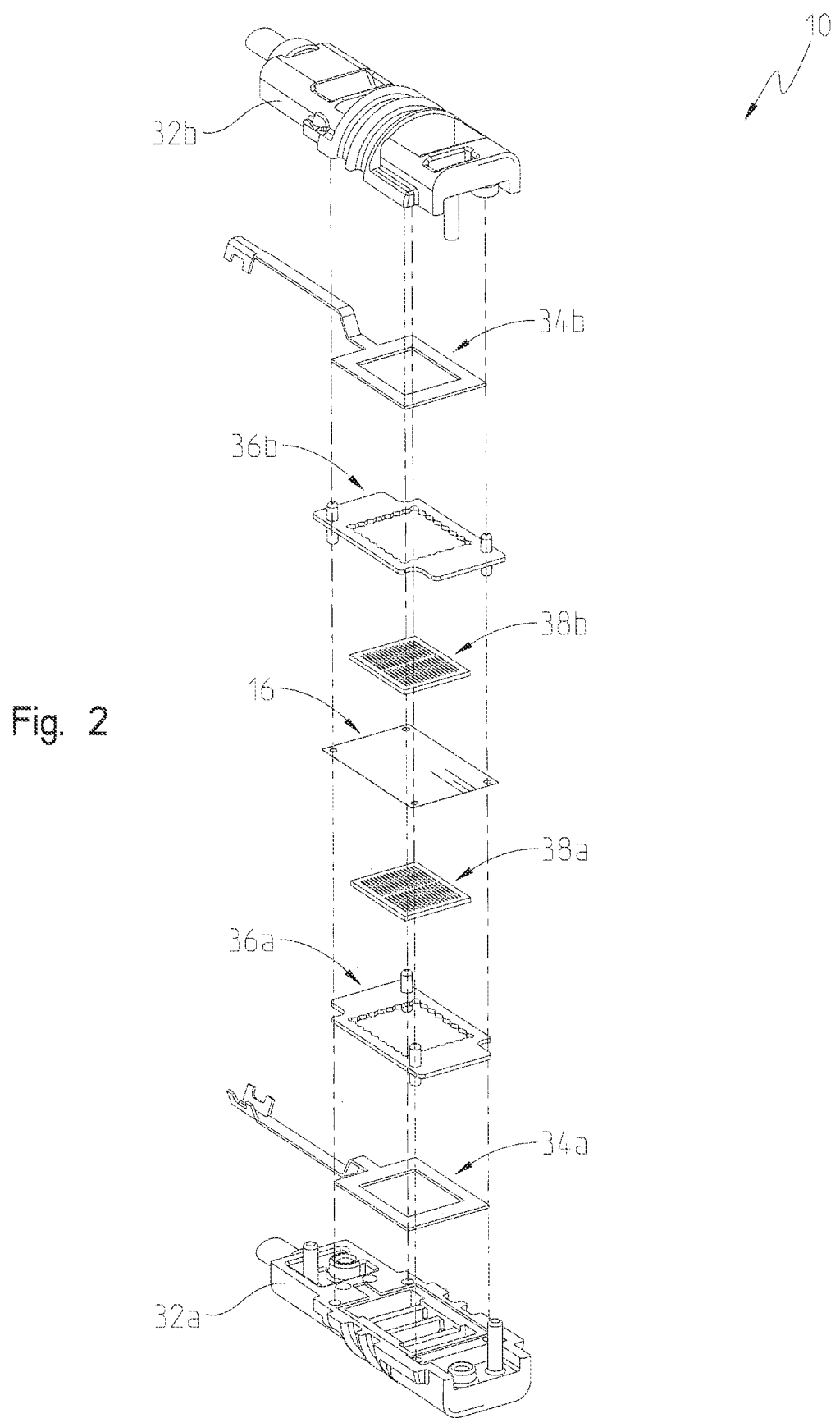
FIG. 2 is an exploded perspective view of the illustrative electrolytic cell assembly of FIG. 1.

With reference to FIG. 2, the illustrative electrolytic cell assembly 10 includes a first housing or carrier 32a and a second housing or carrier 32b, a first current spreader 34a and a second current spreader 34b, a first frame 36a and a second frame 36a, first electrode 38a and second electrode 38b, and electrolytic separator 16. The first and second electrodes 38a, 38b of the electrolytic cell assembly 10 are received within the first and second frames 36a, 36b, respectively. Each electrode 38a, 38b may have a back side 42a, 42b that interacts with the adjacent current spreader 34a, 34b, respectively, and a front side 44a, 44b that interacts with the separator 16. Exemplary electrodes 38a, 38b are constructed of boron-doped silicon or another suitable material. The silicon material may serve as an insulator to resist scale formation, while the doped boron may serve as a conductor. The front side 44a, 44b of each electrode 38a, 38b may have a boron-doped diamond coating or another suitable coating. The coating may be about 3-8 microns thick. The coating may be applied to the underlying silicon material by chemical vapor deposition (CVD) or another suitable deposition technique.

The separator 16 of the electrolytic cell assembly 10 is positioned between the first and second electrodes 38a, 38b. The separator 16 is illustratively a proton exchange membrane (PEM) designed to conduct protons between the electrodes 38a, 38b. The separator 16 may be constructed of a solid polymer electrolyte (SPE) membrane. An exemplary SPE membrane is a hydrophilic electrolytic membrane, such as a polytetrafluoroethylene (PTFE)/perfluorosulfonic acid (PFSA) copolymer membrane, which is commercially available from DuPont™ as a Nation® membrane. Because pressures on the separator 16 are balanced, the separator 16 may be a thin, cast film. The thin separator 16 may allow for some cross-diffusion of water, hydrogen, and/or oxygen without negatively impacting the performance of the electrolytic cell assembly 10. In fact, such diffusion may promote efficiency and output by reducing polarization voltage associated with dehydration and reducing bulk ion resistance. An exemplary separator 16 may be about 20-30 microns thick, such as about 25 microns thick.

The electrodes 38a, 38b communicate with the water flowing through the electrolytic cell assembly 10. Each electrode 38a, 38b may include a conductive plate or body 40 having opposing inner and outer surfaces 46 and 48. A plurality of water passageways 50 (e.g., slots) extend through the body 40 between the inner and outer surfaces 46 and 48 to increase the exposed surface area of each electrode 38a, 38b for communication with water and to allow water flow through each electrode 38a, 38b. To allow for precise control of their size and shape, the water passageways 50 may be formed using deep reactive ion etching (DRIE) or another suitable technique. The DRIE process forms passageways 50 with straight sidewalls 54 extending substantially perpendicular to the surfaces 46 and 48.

In the following detailed description, different illustrative configurations of electrodes 38, 138, 238, 338, 438, 538 and 638 are described. FIGS. 3A-3D illustrate an electrode 38 with a relatively large number of (specifically 34) straight water passageways or apertures, illustratively slots 50. Electrode 38 may be referenced as a "fine 8×8" design. More particularly, two columns 52a and 52b each of seventeen parallel water passageways 50 are formed by walls 54 extending between surfaces 46 and 48.

The electrode 38 includes body 40 including surfaces 46 and 48 defining a thickness (t), opposing upper and lower edges 42a and 42b defining an Overall Height (h), and opposing left and right side edges 44a and 44b defining an Overall Length (l). The thickness (t) of the electrode 38 is illustratively 0.5 millimeters (mm). An Exterior Edge Perimeter is defined by the edges 42a, 42b, 44a and 44b, and has a value equal to twice the Overall Height (h) plus twice the Overall Length (l) (i.e., (2×h)+(2×l)). A Gross Surface Area of the electrode 38 is defined by the front surface 46 of the conductive plate 40 within the Exterior Edge Perimeter, more particularly by the product of the Overall Height (h) and the Overall Length (l) (i.e., (h)×(l)). Additional illustrative dimensions of the body 40 of electrode 38 are detailed in FIGS. 11 and 12.

Figure 3D:
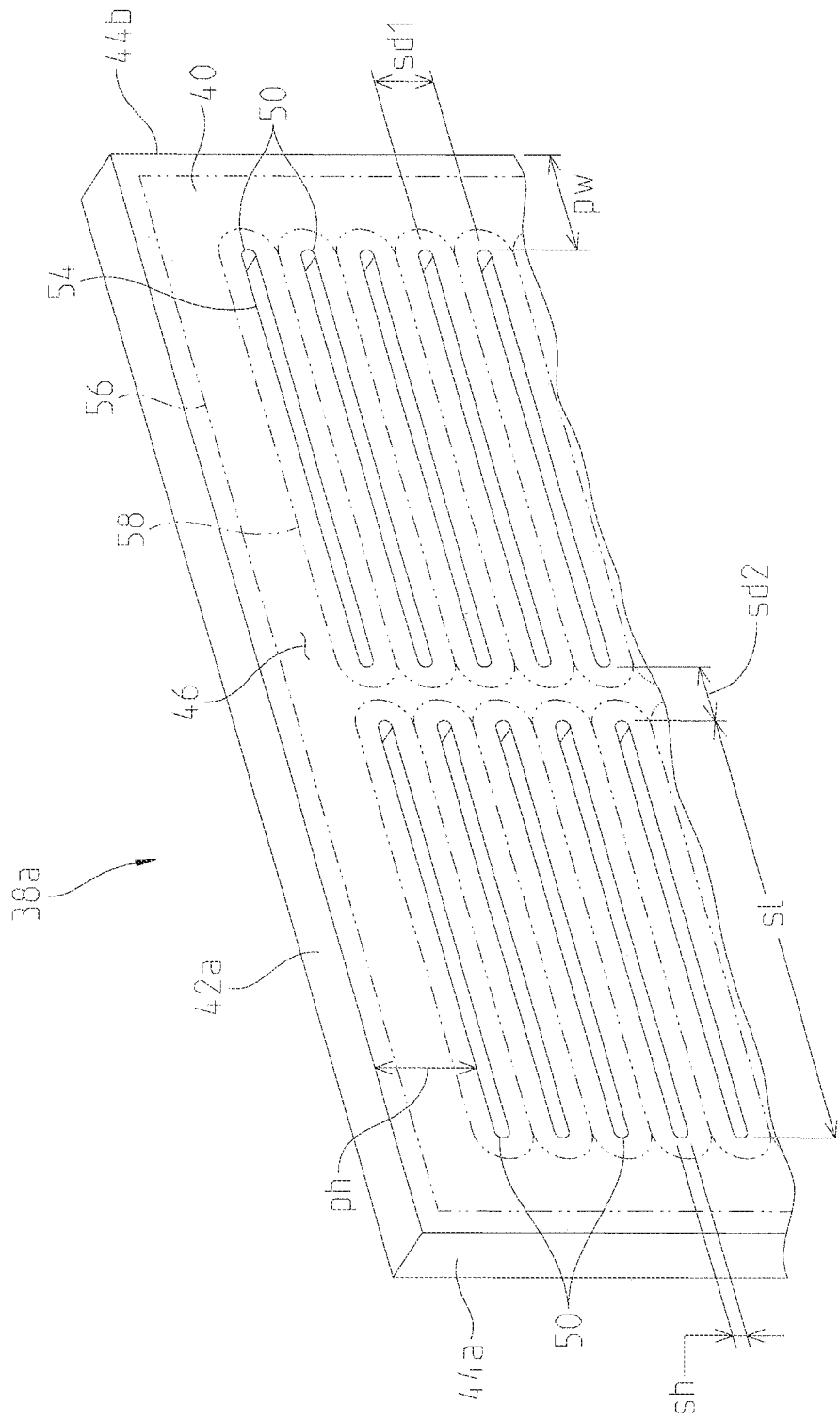
FIG. 3D is an enlarged partial perspective view of the illustrative electrode of FIG. 3A.

The Gross Surface Area of electrode 38 does not determine the Total Active Surface Area of the electrode 38, which is defined as the electrode surface area 46 that contributes the majority of electrolytic reactions. More particularly, the slots 50 reduce the total area available for electrolytic reactions, wherein a Tangent Surface Area is defined as the Gross Surface Area less the total slot area or Aperture Opening Surface Area. With reference to FIGS. 3D and 12, each slot 50 includes an Aperture Height (sh) and an Aperture Length (sl). Adjacent slots 50 have Aperture Centerline Spacing (sd1) and Adjacent Aperture End Spacing (sd2). Aperture Perimeter Height Spacing (ph) is defined in a vertical direction between slots 50 and upper and lower edges 42a and 42b. Aperture Perimeter Width Spacing (pw) is defined in a horizontal direction between slots 50 and left and right edges 44a and 44b. The Aperture Opening Surface Area is defined by the product of the Aperture Height (sh) and the Aperture Length (sl) (i.e., (sh)×(sl)).

With further reference to FIGS. 3D and 12, the slots 50 define a cumulative Aperture Edge Perimeter. An Aperture/Gross Surface Utilization is the percentage of Gross Surface Area not occupied by the Aperture Opening Surface Area. More particularly, the Aperture/Gross Surface Utilization is defined by the equation: (1—(Aperture Opening Surface Area/Gross Surface Area))*100. As shown in FIG. 11, the Aperture/Gross Surface Utilization of electrode 38 is illustratively 83.6%.

Electrolytic reactions that produce ozone begin along the electrode edges, including outer body edges 42a, 42b, 44a, 44b (defining the Exterior Edge Perimeter), and slot edges or walls 54 (defining the Aperture Edge Perimeter). The Exterior Edge Perimeter together with the Aperture Edge Perimeter define a Total Edge Perimeter. A Perimeter/Aperture Ratio is defined by the ratio of the Total Edge Perimeter over the Aperture Opening Surface Area. Illustratively, the Perimeter/Aperture Ratio is greater than 15 mm/mm$^2$, preferably greater than 20 mm/mm$^2$. With reference to FIG. 11, the Perimeter/Aperture Ratio of electrode 38 is illustratively 23.5 mm/mm$^2$.

As noted above, the Gross Surface Area does not determine the Total Active Surface Area of the electrode 38, since slots 50 obviously reduce total active area. Gross Surface Area minus the Aperture Opening Surface Area is referred to the Tangent Surface Area. Similarly, the Tangent Surface Area does not accurately represent the Total Active Surface Area that produces ozone. Ozone reactions only take place within a band gap or Critical Offset Band 56, 58 a short distance from the outer edges 42a, 42b, 44a, 44b of the electrode body 40 and from the walls or edges 54 of the slots 50. Illustratively, the Critical Offset Band 56, 58 extend perpendicularly about 0.3 mm to about 0.4 mm along the outer edges 42a, 42b, 44a, 44b of the body 40 and the edges 54 of the electrode slots 50, respectively. For this reason, spacing the slots 50 closer than 0.6 mm (0.3 mm×2) is not useful due to band overlap. An active band gap or Critical Offset Band is a single dimensional value and simply defines how far from the edges 42a, 42b, 44a, 44b and 54 efficient reactions occur.

An active band area or Active Surface Area is the numerical integration of the active bad gap or Critical Offset Band along the Total Edge Perimeter. This calculation (for the values shown in FIG. 11) may be simplified by taking the product of the Exterior Edge Perimeter with the ideal Critical Offset Band being equal to 0.3 mm and summed with the product of the Aperture Edge Perimeter with the Critical Offset Band of the electrode 38. In this case, the Critical Offset Band is simply ½ of the spacing between the electrode slots 50 and does not consider the extra available gap of the slots 50 adjacent to the edges 54.

The Total Active Surface Area ultimately determines how much ozone the electrode 38 is capable of producing. Total Active Surface Area defines how much ozone the electrode 38 is capable of producing assuming there is sufficient active band gap. Ideally the Total Active Surface Area would equal the Tangent Surface Area (i.e., the ratio of Total Active Surface Area over Tangent Surface Area, defined as Active/Tangent Surface Utilization, would be equal to 1). This defines the efficiency of the electrode geometry to provide maximum ozone for the smallest electrode.

An Active/Tangent Surface Utilization coefficient is defined by the Active Surface Area divided by the Tangent Surface Area, wherein said Ideal Offset Band is between 0.3 mm and 0.4 mm. Illustratively, the Active/Tangent Surface Utilization coefficient is at least equal to 90%, and most preferably 100%. For electrode 38, the Active/Tangent Surface Utilization coefficient is illustratively 93.8% with an Ideal Offset Band of 0.3 mm.

An Active/Gross Surface Utilization coefficient is defined by the Active Surface Area divided by the Gross Surface Area, wherein the Ideal Offset Band is between 0.3 mm and 0.4 mm. Illustratively, the Active/Gross Surface Utilization coefficient is at least equal to 60%, preferably greater than 70%. For electrode 38, the Active/Gross Surface Utilization coefficient is illustratively 78.45% with an ideal Critical Offset Band of 0.3 mm.

An Average Offset Band is defined by the Active Surface Area divided by the Total Edge Perimeter. Illustratively, the Average Offset Band is greater than 0.2 mm and less than 0.4 mm, and most preferably around 0.3 mm. For electrode 38, the Average Offset Band is 0.204.

In order to produce ozone, electrodes must flow high current high enough to create the sufficient over potential otherwise only $O_2$ will be generated. Therefore, an electrode running at very low currents will not produce much ozone. In other words a generator with large electrodes will not produce as much ozone as an electrolytic cell with appropriately sized electrodes running at the same current. The current in the active band area must be high enough to efficiently generate ozone but not too high so as to prematurely erode the boron doped diamond, degrade the Nafion separator 16 and generate waste heat. The optimum Active Surface Area Current Density (A/cm$^2$) for the active band area for producing the maximum amount of ozone is illustratively within a range of between about 1.75 A/cm$^2$ and 2.25 A/cm$^2$, depending on the thickness of the Nafion SPE 16. For electrode 38, the Active Surface Area Current Density is illustratively 1.99 A/cm$^2$. Other SPE formulations may have different optimum current density. Current density higher than the maximum leads to premature erosion of the diamond coating or degradation of the Nafion thus reducing the life of the electrolytic cell 10. Current density less than the minimum produces less ozone and more O$_2$ gas and thus requires a larger and more expensive electrodes for the same amount of ozone at a given current.

Preferably, the slots 50 would have a width within the range of 50 to 150 microns, and illustratively of about 100 microns. Slots 50 of such width allow for even greater active band area, but are about as narrow as they can be to allow for the flow of gases out of the active area and to allow for the inflow water to replace the water that is electrolyzed into gases.

FIGS. 4A-4D illustrate an electrode 138 also having a relatively large number of (specifically 34) straight water passageways. Electrode 138 may be referenced as having a "fine 8×10" design. More particularly, two columns 152a and 152b each of seventeen parallel water passageways 150 are formed by walls 154 extending between surfaces 146 and 148. The electrode 38 includes conductive plate or body 140 including surfaces 146 and 148 defining a thickness (t), opposing upper and lower edges 142a and 142b defining an Overall Height (h), and opposing left and right side edges 144a and 144b defining an Overall Length (l). The thickness (t) of the electrode 138 is illustratively 0.5 millimeters (mm). An Exterior Edge Perimeter is defined by the edges 142a, 142b, 144a and 144b, and has a value equal to twice the Overall Height (h) plus twice the Overall Length (l) (i.e., (2×h)+(2×l)). A Gross Surface Area of the electrode 138 is defined by the front surface 146 of the conductive plate 140 within the Exterior Edge Perimeter, more particularly by the product of the Overall Height (h) and the Overall Length (l) (i.e., (h)×(l)). Additional illustrative dimensions of the body 140 of electrode 138 are detailed in FIGS. 11 and 12.

Figure 4A:
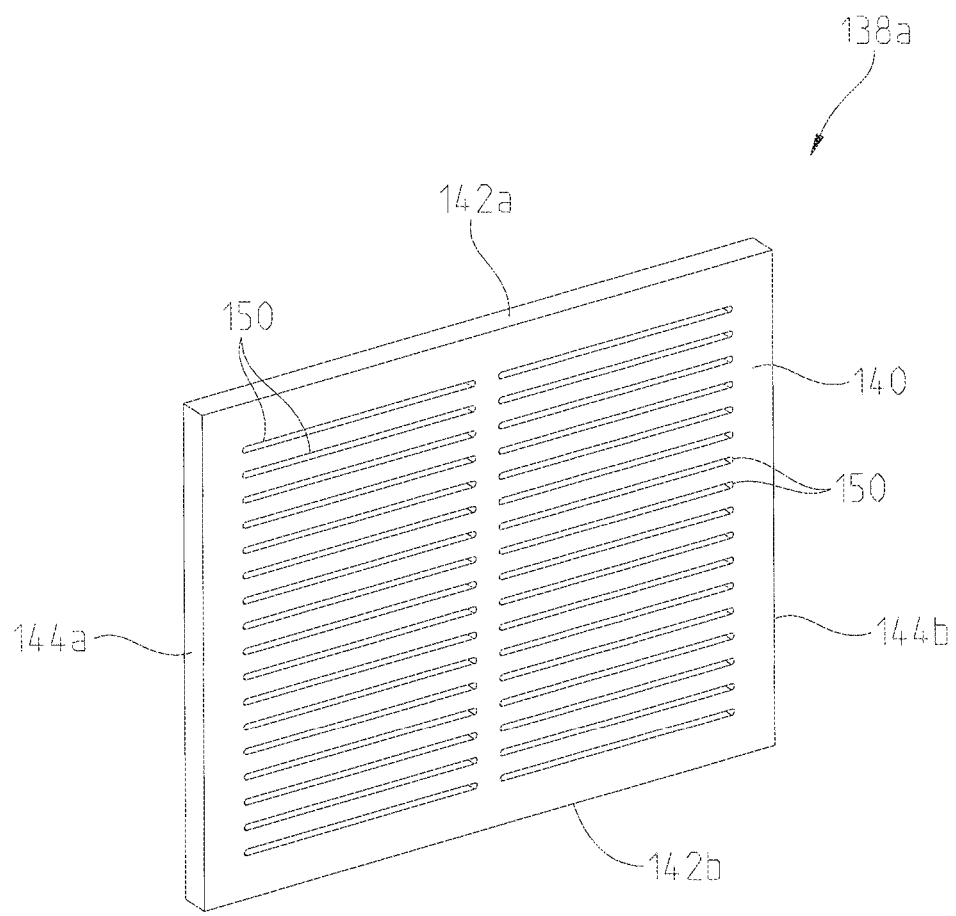
FIG. 4A is a perspective view of an illustrative electrode for use in the electrolytic cell assembly of FIG. 2.
Figure 4D:
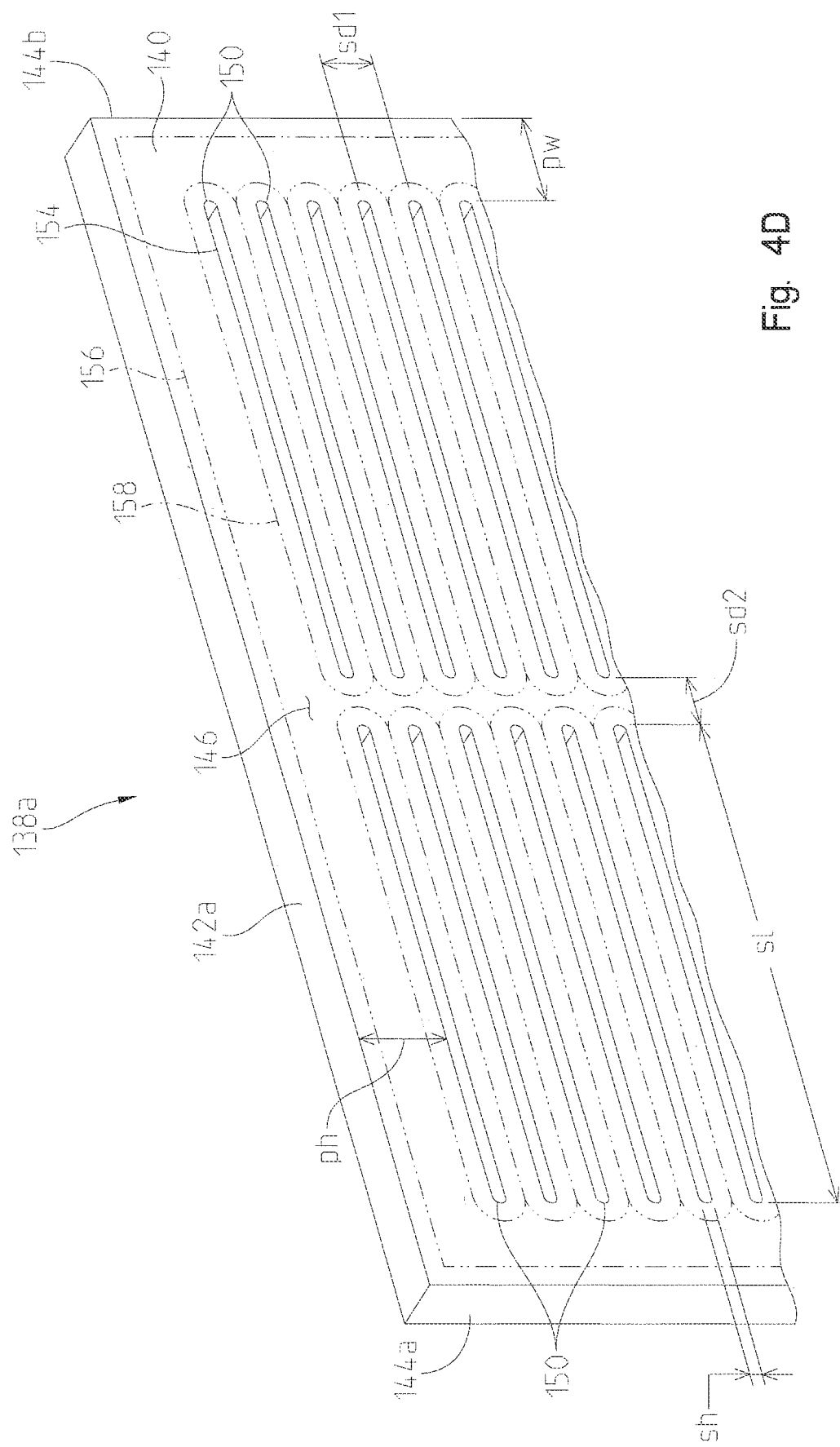
FIG. 4D is an enlarged partial perspective view of the illustrative electrode of FIG. 4A.

With reference to FIGS. 4D and 12, each slot 150 includes an Aperture Height (sh) and an Aperture Length (sl). Adjacent slots 150 have Aperture Centerline Spacing (sd1) and Adjacent Aperture End Spacing (sd2). Aperture Perimeter Height Spacing (ph) is defined in a vertical direction between slots 150 and upper and lower edges 142a and 142b. Aperture Perimeter Width Spacing (pw) is defined in a horizontal direction between slots 150 and left and right edges 144a and 144b. The Aperture Opening Surface Area is defined by the product of the Aperture Height (sh) and the Aperture Length (sl) (i.e., (sh)×(sl)).

With further reference to FIGS. 4D and 12, the slots 150 define a cumulative Aperture Edge Perimeter. An Aperture/Gross Surface Utilization is the percentage of Gross Surface Area not occupied by the Aperture Opening Surface Area. More particularly, the Aperture/Gross Surface Utilization is defined by the equation: (1−(Aperture Opening Surface Area/Gross Surface Area))*100. As shown in FIG. 11, the Aperture/Gross Surface Utilization of electrode 138 is illustratively 82.7%.

The outer body edges 142a, 142b, 144a, 144b define the Exterior Edge Perimeter, while the slot edges or walls 154 define the Aperture Edge Perimeter. The Exterior Edge Perimeter together with the Aperture Edge Perimeter define a Total Edge Perimeter. A Perimeter/Aperture Ratio is defined by the ratio of the Total Edge Perimeter over the Aperture Opening Surface Area. Illustratively, the Perimeter/Aperture Ratio is greater than 15 mm/mm$^2$, preferably greater than 20 mm/mm$^2$. With reference to FIG. 11, the Perimeter/Aperture Ratio of electrode 138 is illustratively 23.0 mm/mm$^2$.

As detailed above, the Total Active Surface Area ultimately determines how much ozone the electrode 138 is capable of producing. Total Active Surface Area defines how much ozone the electrode 138 is capable of producing assuming there is sufficient active band gap. Ideally the Total Active Surface Area would equal the Tangent Surface Area (i.e., the ratio of Total Active Surface Area over Tangent Surface Area, defined as Active/Tangent Surface Utilization, would be equal to 1). This defines the efficiency of the electrode geometry to provide maximum ozone for the smallest electrode.

An Active/Tangent Surface Utilization coefficient is defined by the Active Surface Area divided by the Tangent Surface Area, wherein said Ideal Offset Band is between 0.3 mm and 0.4 mm. Illustratively, the Active/Tangent Surface Utilization coefficient is at least equal to 90%, and most preferably 100%. For electrode 138, the Active/Tangent Surface Utilization coefficient is illustratively 94.4% with an Ideal Offset Band of 0.3 mm.

An Active/Gross Surface Utilization coefficient is defined by the Active Surface Area divided by the Gross Surface Area, wherein the Ideal Offset Band is between 0.3 mm and 0.4 mm. Illustratively, the Active/Gross Surface Utilization coefficient is at least equal to 60%, preferably greater than 70%. For electrode 138, the Active/Gross Surface Utilization coefficient is illustratively 78.01% with an ideal Critical Offset Band of 0.3 mm.

An Average Offset Band is defined by the Active Surface Area divided by the Total Edge Perimeter. Illustratively, the Average Offset Band is greater than 0.2 mm and less than 0.4 mm, and most preferably around 0.3 mm. For electrode 138, the Average Offset Band is 0.196. With further reference to FIG. 11, the Active Surface Area Current Density of electrode 138 is illustratively 1.60 A/cm$^2$.

FIGS. 5A-5D illustrate an electrode 238 having an intermediate number of (specifically 26) water passageways 250 that vary in width repeatedly across their length from a widened bulbous shape 251 to a narrowed straight shape 253. Electrode 238 may be referenced as having a "knotted 8×10" design. More particularly, two columns 252a and 252b each of seventeen parallel water passageways 250 are formed by walls 254 extending between surfaces 246 and 248. The electrode 238 includes a conductive plate or body 240 including surfaces 246 and 248 defining a thickness (t), opposing upper and lower edges 242a and 242b defining an Overall Height (h), and opposing left and right side edges 244a and 244b defining an Overall Length (l). The thickness (t) of the electrode 238 is illustratively 0.5 millimeters (mm). An Exterior Edge Perimeter is defined by the edges 242a, 242b, 244a and 244b, and has a value equal to twice the Overall Height (h) plus twice the Overall Length (l) (i.e., (2×h)+(2×l)). A Gross Surface Area of the electrode 238 is defined by the front surface 246 of the conductive plate 240 within the Exterior Edge Perimeter, more particularly by the product of the Overall Height (h) and the Overall Length (l) (i.e., (h)×(l)). Additional illustrative dimensions of the body 240 of electrode 238 are detailed in FIGS. 11 and 12.

Figure 5A:
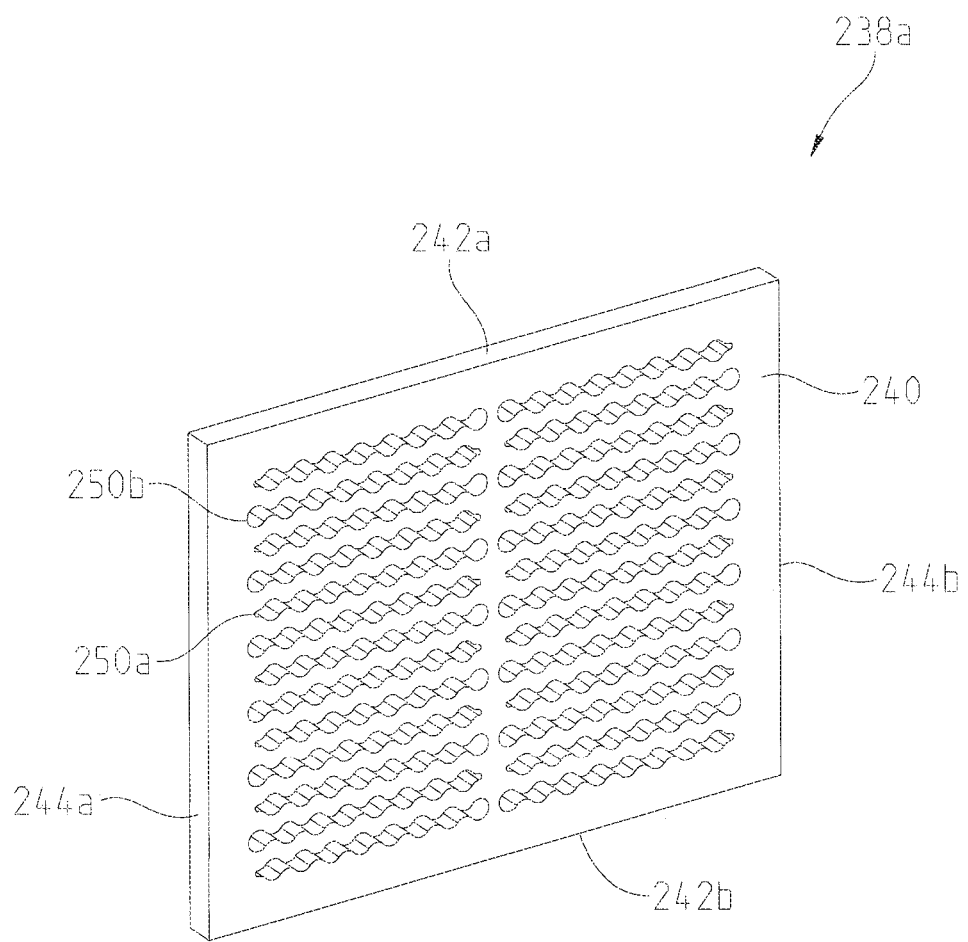
FIG. 5A is a perspective view of an illustrative electrode for use in the electrolytic cell assembly of FIG. 2.
Figure 5D:
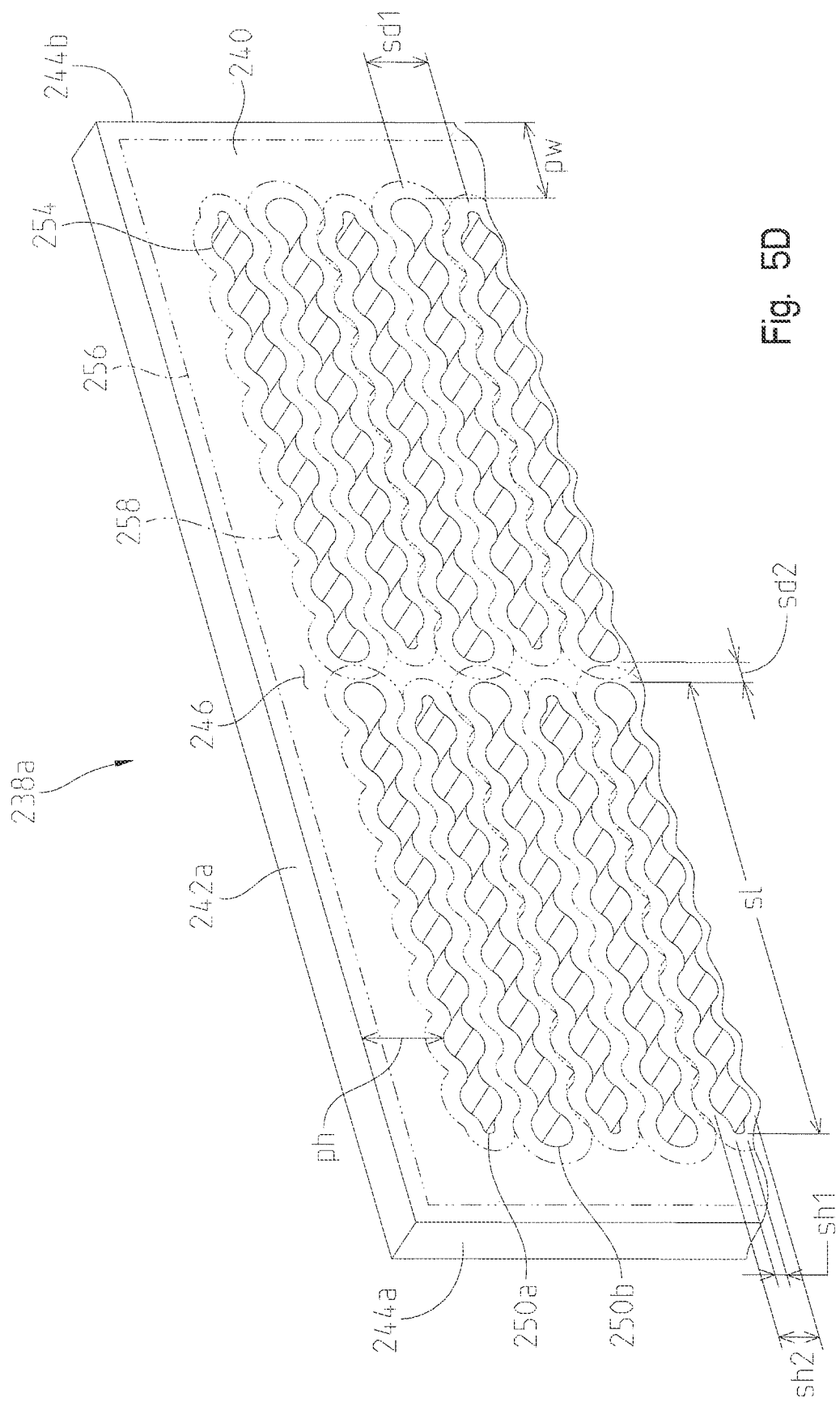
FIG. 5D is an enlarged perspective view of the illustrative electrode of FIG. 5A.

With reference to FIGS. 5D and 12, each slot 250 includes a Minimum Aperture Height (sh1), a Maximum Aperture Height (sh2) and an Aperture Length (sl). Adjacent slots 250 have Aperture Centerline Spacing (sd1) and Adjacent Aperture End Spacing (sd2). Aperture Perimeter Height Spacing (ph) is defined in a vertical direction between slots 250 and upper and lower edges 242a and 242b. Aperture Perimeter Width Spacing (pw) is defined in a horizontal direction between slots 250 and left and right edges 244a and 244b. The Aperture Opening Surface Area is defined by the product of the Aperture Height (sh) and the Aperture Length (sl) (i.e., (sh)×(sl)).

With further reference to FIGS. 5D and 12, the slots 250 define a cumulative Aperture Edge Perimeter. An Aperture/Gross Surface Utilization is the percentage of Gross Surface Area not occupied by the Aperture Opening Surface Area. More particularly, the Aperture/Gross Surface Utilization is defined by the equation: (1—(Aperture Opening Surface Area/Gross Surface Area))*100. As shown in FIG. 11, the Aperture/Gross Surface Utilization of electrode 238 is illustratively 70.6%.

The outer body edges 242a, 242b, 244a, 244b define the Exterior Edge Perimeter, while the slot edges or walls 254 define the Aperture Edge Perimeter. The Exterior Edge Perimeter together with the Aperture Edge Perimeter define a Total Edge Perimeter. A Perimeter/Aperture Ratio is defined by the ratio of the Total Edge Perimeter over the Aperture Opening Surface Area. With reference to FIG. 11, the Perimeter/Aperture Ratio of electrode 238 is illustratively 12.1 mm/mm$^2$.

As detailed above, the Total Active Surface Area ultimately determines how much ozone the electrode 238 is capable of producing. Total Active Surface Area defines how much ozone the electrode 238 is capable of producing assuming there is sufficient active band gap. Ideally the Total Active Surface Area would equal the Tangent Surface Area (i.e., the ratio of Total Active Surface Area over Tangent Surface Area, defined as Active/Tangent Surface Utilization, would be equal to 1). This defines the efficiency of the electrode geometry to provide maximum ozone for the smallest electrode.

An Active/Tangent Surface Utilization coefficient is defined by the Active Surface Area divided by the Tangent Surface Area, wherein said Ideal Offset Band is between 0.3 mm and 0.4 mm. Illustratively, the Active/Tangent Surface Utilization coefficient is at least equal to 90%, and most preferably 100%. For electrode 238, the Active/Tangent Surface Utilization coefficient is illustratively 91.8% with an ideal Critical Offset Band of 0.3 mm.

An Active/Gross Surface Utilization coefficient is defined by the Active Surface Area divided by the Gross Surface Area, wherein the Ideal Offset Band is between 0.3 mm and 0.4 mm. Illustratively, the Active/Gross Surface Utilization coefficient is at least equal to 60%, preferably greater than 70%. For electrode 238, the Active/Gross Surface Utilization coefficient is illustratively 64.85% with an ideal Critical Offset Band of 0.3 mm.

An Average Offset Band is defined by the Active Surface Area divided by the Total Edge Perimeter. Illustratively, the Average Offset Band is greater than 0.2 mm and less than 0.4 mm, and most preferably around 0.3 mm. For electrode 238, the Average Offset Band is 0.183. With further reference to FIG. 11, the Active Surface Area Current Density of electrode 238 is illustratively 1.93 A/cm$^2$.

FIGS. 6A-6D illustrate an electrode 338 having a relatively small number of (specifically 22) water passageways 350 that deviate side-to-side in a zig-zag or wave-like pattern across their length. Electrode 338a may be referenced as a "serpentine 8×10" design. More particularly, two columns 352a and 352b each of seventeen parallel water passageways 350 are formed by walls 354 extending between surfaces 346 and 348. The electrode 338 includes body 340 including surfaces 346 and 348 defining a thickness (t), opposing upper and lower edges 342a and 342b defining an Overall Height (h), and opposing left and right side edges 344a and 344b defining an Overall Length (l). The thickness (t) of the electrode 338 is illustratively 0.5 millimeters (mm). An Exterior Edge Perimeter is defined by edges 342a, 342b, 344a and 344b, and has a value equal to twice the Overall Height (h) plus twice the Overall Length (l) (i.e., (2×h)+(2×l)). A Gross Surface Area of the electrode 338 is defined by the front surface 346 of the conductive plate 340 within the Exterior Edge Perimeter, more particularly by the product of the Overall Height (h) and the Overall Length (l) (i.e., (h)×(l)). Additional illustrative dimensions of the body 340 of electrode 338 are detailed in FIGS. 11 and 12.

Figure 6A:
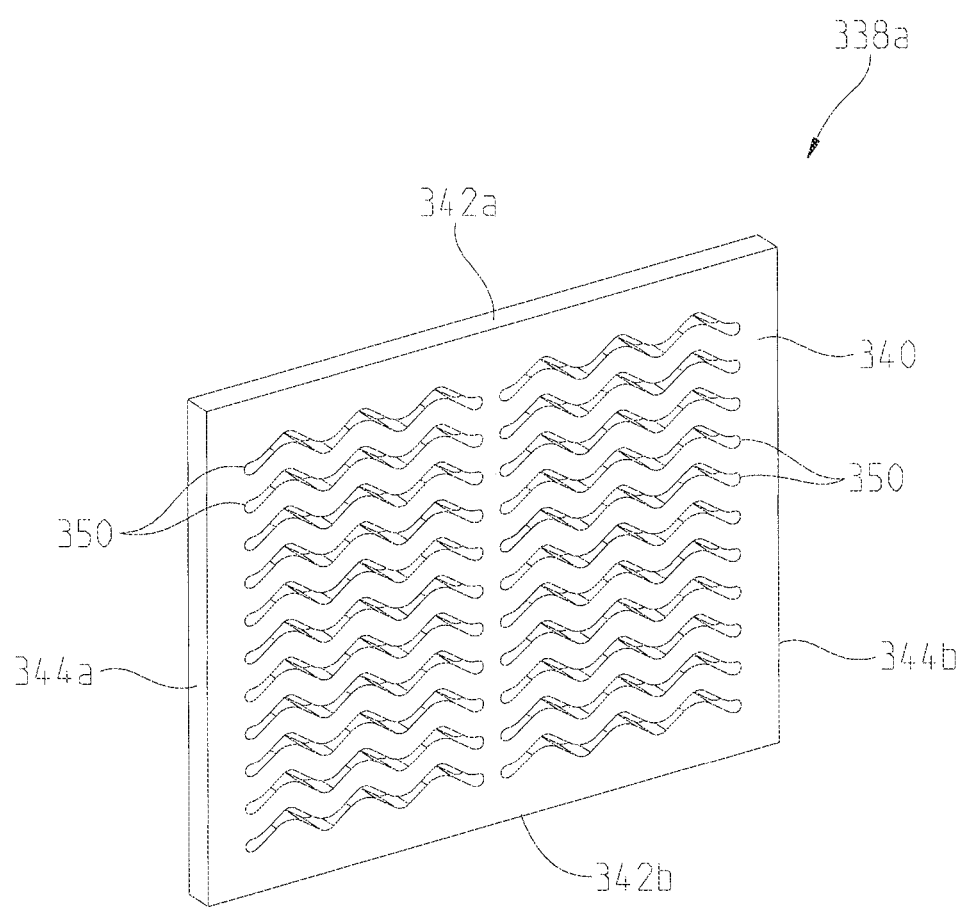
FIG. 6A is a perspective view of an illustrative electrode for use in the electrolytic cell assembly of FIG. 2.
Figure 6D:
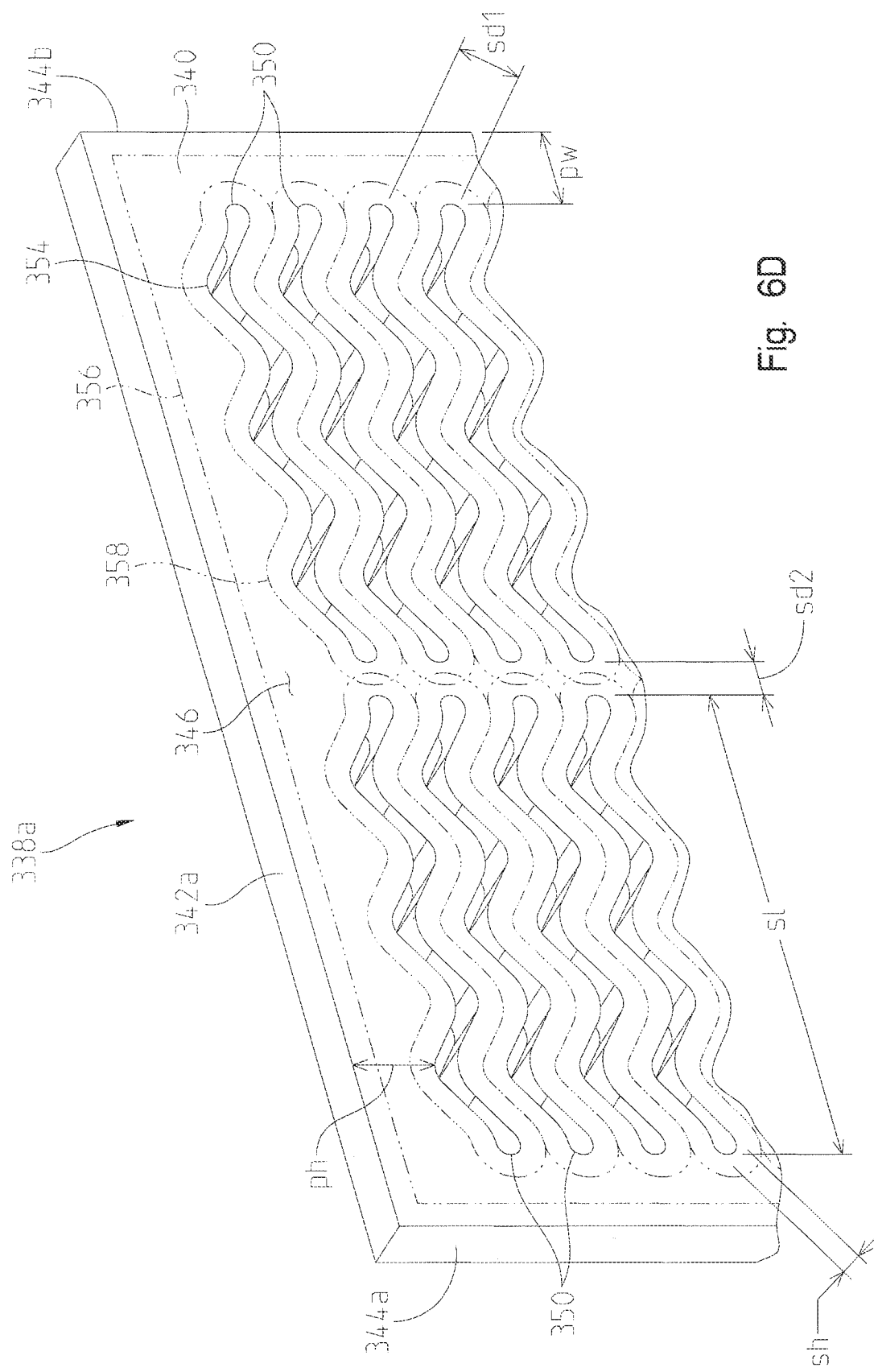
FIG. 6D is an enlarged perspective view of the illustrative electrode of FIG. 6A.

With reference to FIG. 6D, each slot 350 includes an Aperture Height (sh) and an Aperture Length (sl). Adjacent slots 350 have Aperture Centerline Spacing (sd1) and Adjacent Aperture End Spacing (sd2). Aperture Perimeter Height Spacing (ph) is defined in a vertical direction between slots 350 and upper and lower edges 342a and 342b. Aperture Perimeter Width Spacing (pw) is defined in a horizontal direction between slots 350 and left and right edges 344a and 344b. The Aperture Opening Surface Area is defined by the product of the Aperture Height (sh) and the Aperture Length (sl) (i.e., (sh)×(sl)).

With further reference to FIGS. 6D and 12, the slots 350 define a cumulative Aperture Edge Perimeter. An Aperture/Gross Surface Utilization is the percentage of Gross Surface Area not occupied by the Aperture Opening Surface Area. More particularly, the Aperture/Gross Surface Utilization is defined by the equation: (1—(Aperture Opening Surface Area/Gross Surface Area))*100. As shown in FIG. 11, the Aperture/Gross Surface Utilization of electrode 338 is illustratively 80.3%.

The outer body edges 342a, 342b, 344a, 344b define the Exterior Edge Perimeter, while the slot edges or walls 354 define the Aperture Edge Perimeter. The Exterior Edge Perimeter together with the Aperture Edge Perimeter define a Total Edge Perimeter. A Perimeter/Aperture Ratio is defined by the ratio of the Total Edge Perimeter over the Aperture Opening Surface Area. Illustratively, the Perimeter/Aperture Ratio is greater than 15 mm/mm$^2$, preferably greater than 20 mm/mm$^2$. With reference to FIG. 11, the Perimeter/Aperture Ratio of electrode 338 is illustratively 15.8 mm/mm$^2$.

As detailed above, the Total Active Surface Area ultimately determines how much ozone the electrode 338 is capable of producing. Total Active Surface Area defines how much ozone the electrode 338 is capable of producing assuming there is sufficient active band gap. Ideally the Total Active Surface Area would equal the Tangent Surface Area (i.e., the ratio of Total Active Surface Area over Tangent Surface Area, defined as Active/Tangent Surface Utilization, would be equal to 1). This defines the efficiency of the electrode geometry to provide maximum ozone for the smallest electrode.

An Active/Tangent Surface Utilization coefficient is defined by the Active Surface Area divided by the Tangent Surface Area, wherein said Ideal Offset Band is between 0.3 mm and 0.4 mm. Illustratively, the Active/Tangent Surface Utilization coefficient is at least equal to 90%, and most preferably 100%. For electrode 338, the Active/Tangent Surface Utilization coefficient is illustratively 91.0% with an Ideal Offset Band of 0.3 mm.

An Active/Gross Surface Utilization coefficient is defined by the Active Surface Area divided by the Gross Surface Area, wherein the Ideal Offset Band is between 0.3 mm and 0.4 mm. Illustratively, the Active/Gross Surface Utilization coefficient is at least equal to 60%, preferably greater than 70%. For electrode 338, the Active/Gross Surface Utilization coefficient is illustratively 73.02% with an ideal Critical Offset Band of 0.3 mm.

An Average Offset Band is defined by the Active Surface Area divided by the Total Edge Perimeter. Illustratively, the Average Offset Band is greater than 0.2 mm and less than 0.4 mm, and most preferably around 0.3 mm. For electrode 338, the Average Offset Band is 0.233. With further reference to FIG. 11, the Active Surface Area Current Density of electrode 338 is illustratively 1.71 A/cm$^2$.

FIGS. 7A-7D illustrate an electrode 438 having a relatively small number of (specifically 22) straight water passageways 450. Electrode 438 may be referenced as having a "sparse" design. More particularly, two columns 452a and 452b each of seventeen parallel water passageways 450 are formed by walls 454 extending between surfaces 446 and 448. The electrode 438 includes a conductive plate or body 440 including surfaces 446 and 448 defining a thickness (t), opposing upper and lower edges 442a and 442b defining an Overall Height (h), and opposing left and right side edges 444a and 444b defining an Overall Length (l). The thickness (t) of the electrode 438 is illustratively 0.5 millimeters (mm). An Exterior Edge Perimeter is defined by the edges 442a, 442b, 444a and 444b, and has a value equal to twice the Overall Height (h) plus twice the Overall Length (l) (i.e., (2×h)+(2×l)). A Gross Surface Area of the electrode 438 is defined by the front surface 446 of the conductive plate 440 within the Exterior Edge Perimeter, more particularly by the product of the Overall Height (h) and the Overall Length (l) (i.e., (h)×(l)). Additional illustrative dimensions of the body 440 of electrode 438 are detailed in FIGS. 11 and 12.

Figure 7A:
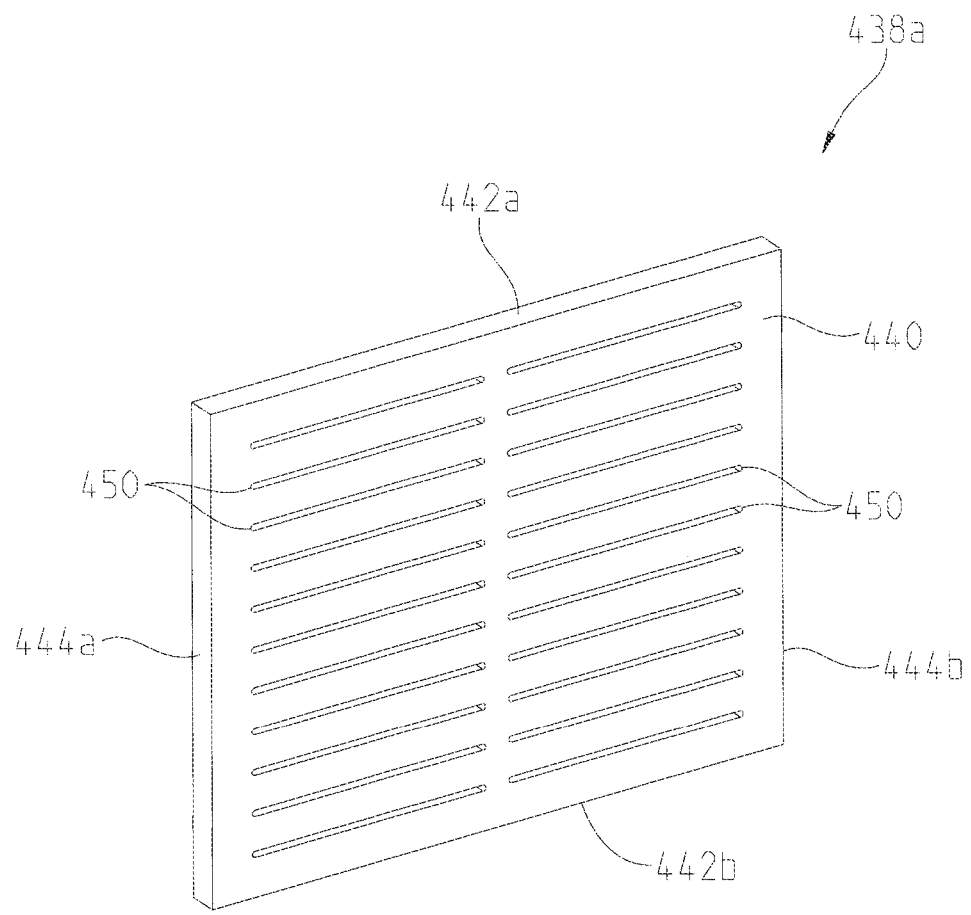
FIG. 7A is a perspective view of an illustrative electrode for use in the electrolytic cell assembly of FIG. 2.
Figure 7C:
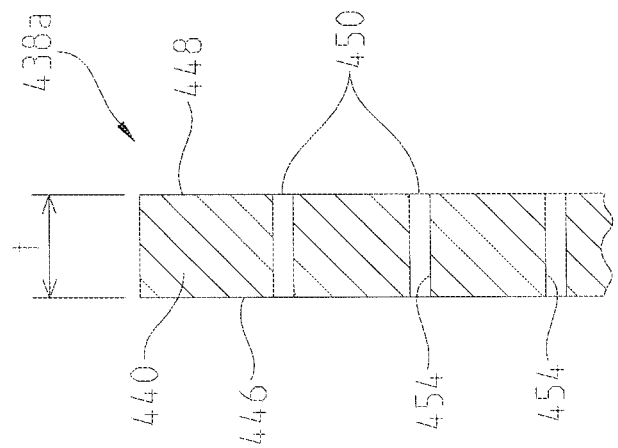
FIG. 7C is a partial cross-sectional view taken along line 7C-7C of FIG. 7B.
Figure 7B:
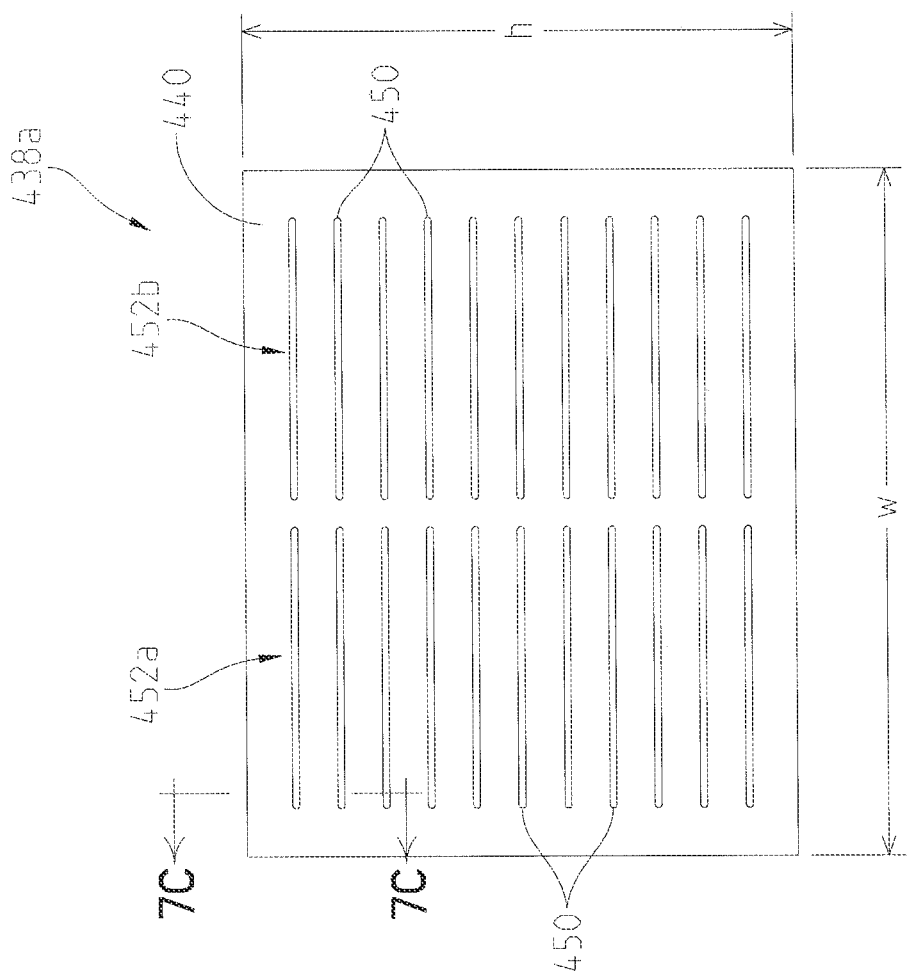
FIG. 7B is a front plan view of the illustrative electrode of FIG. 7A.
Figure 7D:
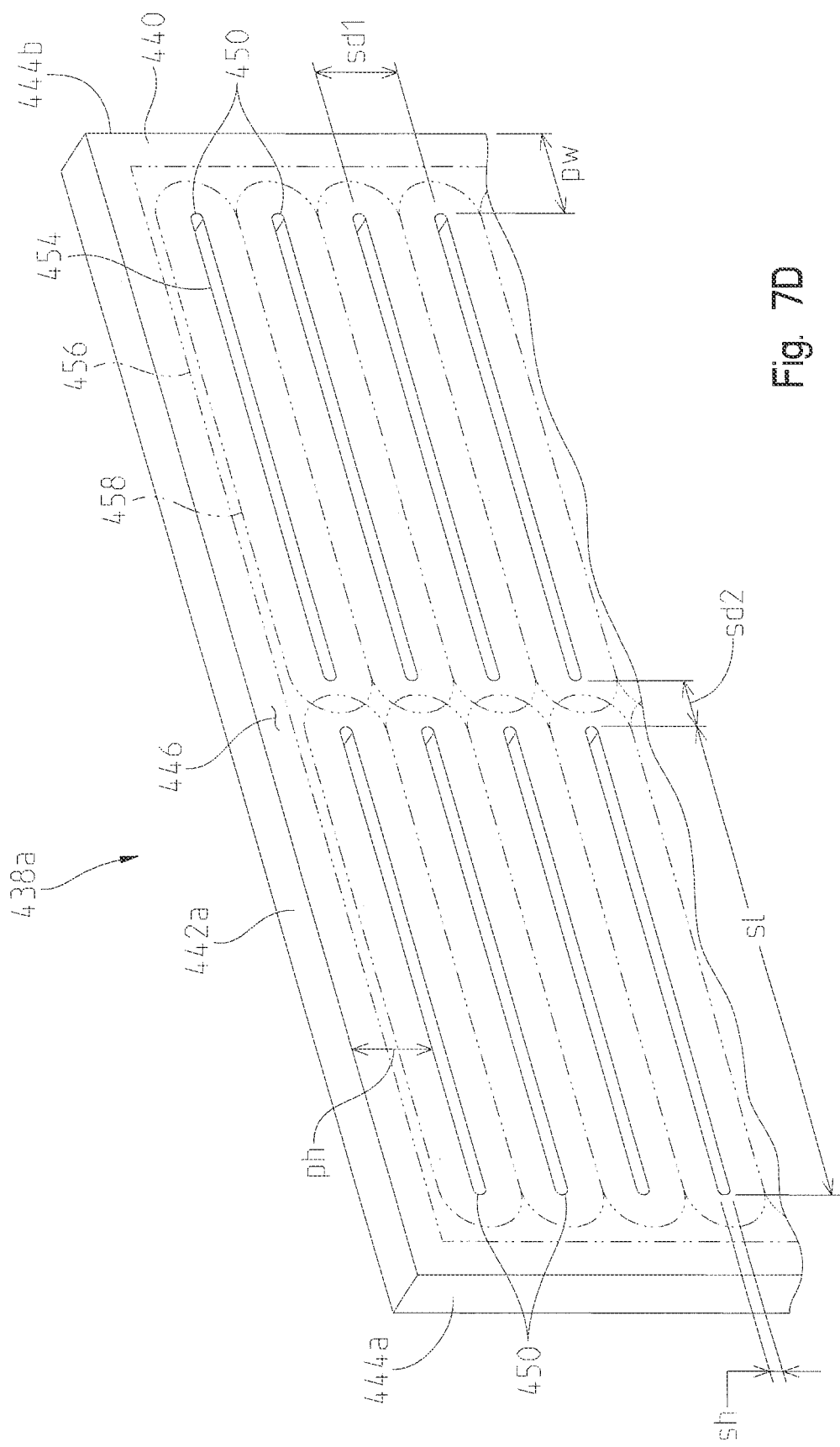
FIG. 7D is an enlarged perspective view of the illustrative electrode of FIG. 7A.

With reference to FIGS. 7D and 12, each slot 450 includes an Aperture Height (sh) and an Aperture Length (sl). Adjacent slots 450 have Aperture Centerline Spacing (sd1) and Adjacent Aperture End Spacing (sd2). Aperture Perimeter Height Spacing (ph) is defined in a vertical direction between slots 450 and upper and lower edges 442a and 442b. Aperture Perimeter Width Spacing (pw) is defined in a horizontal direction between slots 450 and left and right edges 444a and 444b. The Aperture Opening Surface Area is defined by the product of the Aperture Height (sh) and the Aperture Length (sl) (i.e., (sh)×(sl)).

With further reference to FIGS. 7D and 12, the slots 450 define a cumulative Aperture Edge Perimeter. An Aperture/Gross Surface Utilization is the percentage of Gross Surface Area not occupied by the Aperture Opening Surface Area. More particularly, the Aperture/Gross Surface Utilization is defined by the equation: (1—(Aperture Opening Surface Area/Gross Surface Area))*100. As shown in FIG. 11, the Aperture/Gross Surface Utilization of electrode 438 is illustratively 88.3%.

The outer body edges 442a, 442b, 444a, 444b define the Exterior Edge Perimeter, while the slot edges or walls 454 define the Aperture Edge Perimeter. The Exterior Edge Perimeter together with the Aperture Edge Perimeter define a Total Edge Perimeter. A Perimeter/Aperture Ratio is defined by the ratio of the Total Edge Perimeter over the Aperture Opening Surface Area. Illustratively, the Perimeter/Aperture Ratio is greater than 15 mm/mm$^2$, preferably greater than 20 mm/mm$^2$. With reference to FIG. 11, the Perimeter/Aperture Ratio of electrode 438 is illustratively 23.4 mm/mm$^2$.

As detailed above, the Total Active Surface Area ultimately determines how much ozone the electrode 438 is capable of producing. Total Active Surface Area defines how much ozone the electrode 438 is capable of producing assuming there is sufficient active band gap. Ideally the Total Active Surface Area would equal the Tangent Surface Area (i.e., the ratio of Total Active Surface Area over Tangent Surface Area, defined as Active/Tangent Surface Utilization, would be equal to 1). This defines the efficiency of the electrode geometry to provide maximum ozone for the smallest electrode.

An Active/Tangent Surface Utilization coefficient is defined by the Active Surface Area divided by the Tangent Surface Area, wherein said Ideal Offset Band is between 0.3 mm and 0.4 mm. Illustratively, the Active/Tangent Surface Utilization coefficient is at least equal to 90%, and most preferably 100%. For electrode 438, the Active/Tangent Surface Utilization coefficient is illustratively 95.8% with an Ideal Offset Band of 0.3 mm.

An Active/Gross Surface Utilization coefficient is defined by the Active Surface Area divided by the Gross Surface Area, wherein the Ideal Offset Band is between 0.3 mm and 0.4 mm. Illustratively, the Active/Gross Surface Utilization coefficient is at least equal to 60%, preferably greater than 70%. For electrode 438, the Active/Gross Surface Utilization coefficient is illustratively 84.57% with an ideal Critical Offset Band of 0.3 mm.

An Average Offset Band is defined by the Active Surface Area divided by the Total Edge Perimeter. Illustratively, the Average Offset Band is greater than 0.2 mm and less than 0.4 mm, and most preferably around 0.3 mm. For electrode 438, the Average Offset Band is 0.309. With further reference to FIG. 11, the Active Surface Area Current Density of electrode 438 is illustratively 1.48 A/cm$^2$.

Variations of electrode 438 including different dimensions are further detailed in FIGS. 11 and 12.

FIGS. 8A-8D illustrate an electrode 538 having a relatively large number of (specifically 51) straight water passageways 550. Electrode 538 may be referenced as having a "fine 8×12" design. More particularly, two columns 552a and 552b each of seventeen parallel water passageways 550 are formed by walls 554 extending between surfaces 546 and 548. The electrode 538 includes a conductive plate or body 540 including surfaces 546 and 548 defining a thickness (t), opposing upper and lower edges 542a and 542b defining an Overall Height (h), and opposing left and right side edges 544a and 544b defining an Overall Length (l). The thickness (t) of the electrode 538 is illustratively 0.5 millimeters (mm). An Exterior Edge Perimeter is defined by the edges 542a, 542b, 544a and 544b, and has a value equal to twice the Overall Height (h) plus twice the Overall Length (l) (i.e., (2×h)+(2×l)). A Gross Surface Area of the electrode 538 is defined by the front surface 146 of the conductive plate 540 within the Exterior Edge Perimeter, more particularly by the product of the Overall Height (h) and the Overall Length (l) (i.e., (h)×(l)). Additional illustrative dimensions of the body 540 of electrode 538 are detailed in FIGS. 11 and 12.

Figure 8A:
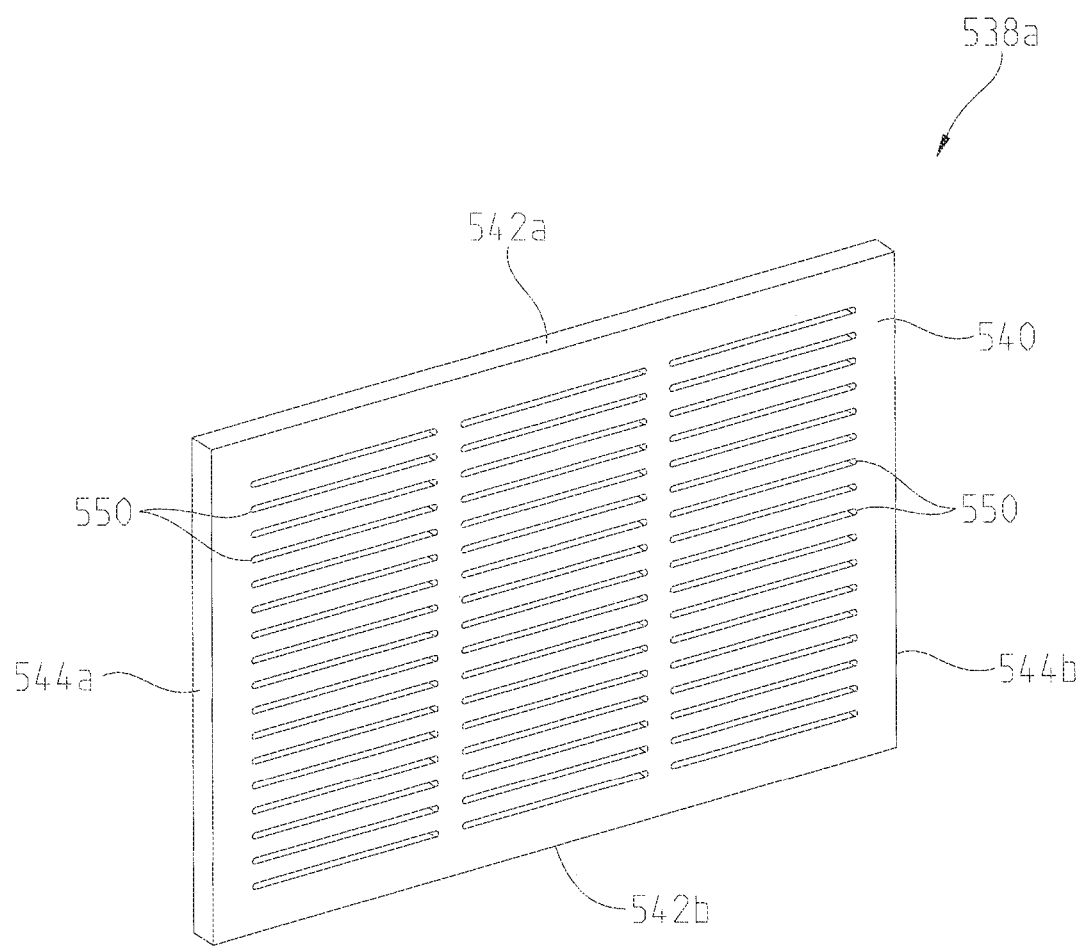
FIG. 8A is a perspective view of an illustrative electrode for use in the electrolytic cell assembly of FIG. 2.
Figure 8D:
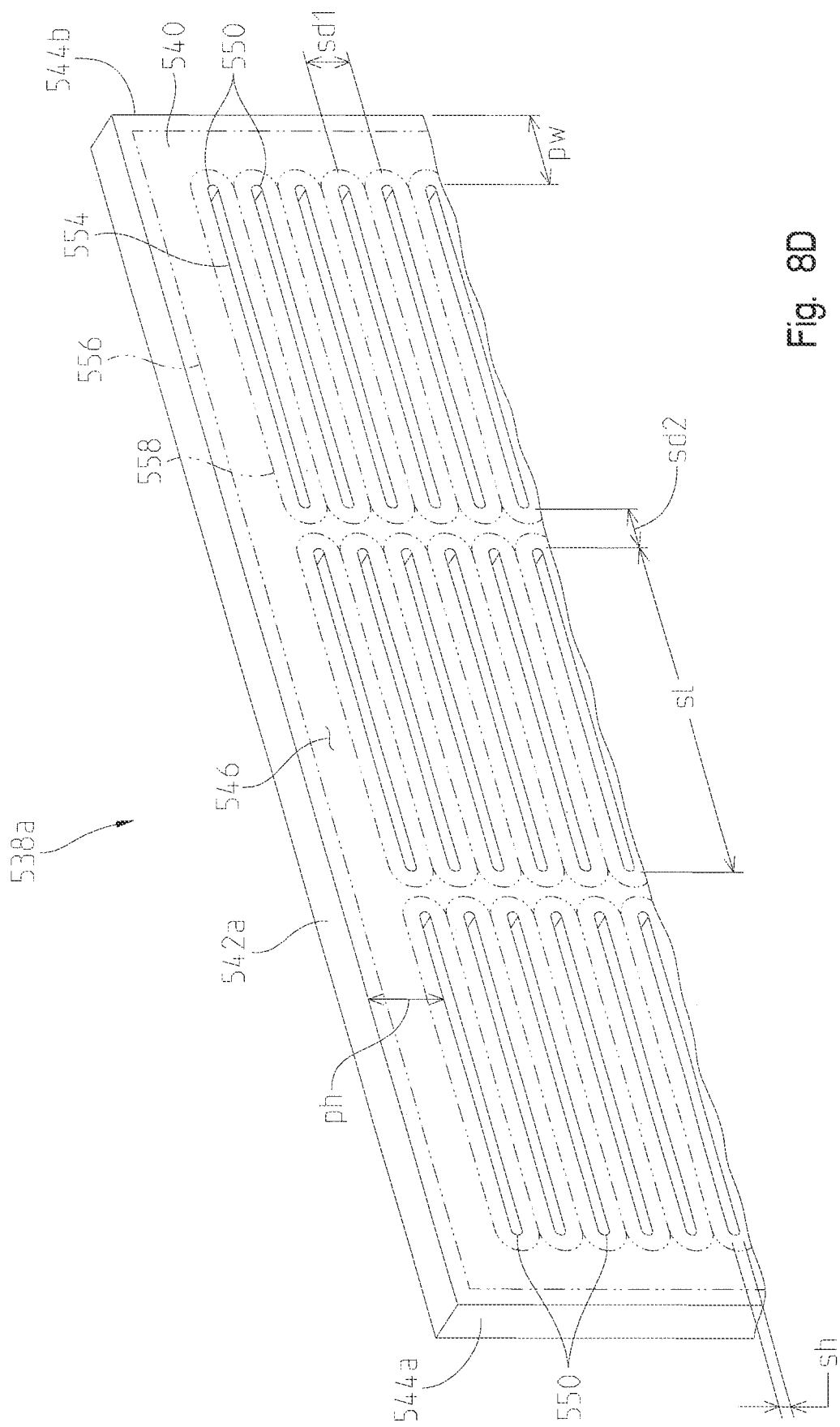
FIG. 8D is an enlarged perspective view of the illustrative electrode of FIG. 8A.

With reference to FIGS. 8D and 12, each slot 550 includes an Aperture Height (sh) and an Aperture Length (sl). Adjacent slots 550 have Aperture Centerline Spacing (sd1) and Adjacent Aperture End Spacing (sd2). Aperture Perimeter Height Spacing (ph) is defined in a vertical direction between slots 550 and upper and lower edges 542a and

542b. Aperture Perimeter Width Spacing (pw) is defined in a horizontal direction between slots 550 and left and right edges 544a and 544b. The Aperture Opening Surface Area is defined by the product of the Aperture Height (sh) and the Aperture Length (sl) (i.e., (sh)×(sl)).

With further reference to FIGS. 8D and 12, the slots 550 define a cumulative Aperture Edge Perimeter. An Aperture/Gross Surface Utilization is the percentage of Gross Surface Area not occupied by the Aperture Opening Surface Area. More particularly, the Aperture/Gross Surface Utilization is defined by the equation: (1—(Aperture Opening Surface Area/Gross Surface Area))*100. As shown in FIG. 11, the Aperture/Gross Surface Utilization of electrode 538 is illustratively 82.8%.

The outer body edges 542a, 542b, 544a, 544b define the Exterior Edge Perimeter, while the slot edges or walls 554 define the Aperture Edge Perimeter. The Exterior Edge Perimeter together with the Aperture Edge Perimeter define a Total Edge Perimeter. A Perimeter/Aperture Ratio is defined by the ratio of the Total Edge Perimeter over the Aperture Opening Surface Area. Illustratively, the Perimeter/Aperture Ratio is greater than 15 mm/mm$^2$, preferably greater than 20 mm/mm$^2$. With reference to FIG. 11, the Perimeter/Aperture Ratio of electrode 538 is illustratively 22.9 mm/mm$^2$.

As detailed above, the Total Active Surface Area ultimately determines how much ozone the electrode 538 is capable of producing. Total Active Surface Area defines how much ozone the electrode 538 is capable of producing assuming there is sufficient active band gap. Ideally the Total Active Surface Area would equal the Tangent Surface Area (i.e., the ratio of Total Active Surface Area over Tangent Surface Area, defined as Active/Tangent Surface Utilization, would be equal to 1). This defines the efficiency of the electrode geometry to provide maximum ozone for the smallest electrode.

An Active/Tangent Surface Utilization coefficient is defined by the Active Surface Area divided by the Tangent Surface Area, wherein said Ideal Offset Band is between 0.3 mm and 0.4 mm. Illustratively, the Active/Tangent Surface Utilization coefficient is at least equal to 90%, and most preferably 100%. For electrode 538, the Active/Tangent Surface Utilization coefficient is illustratively 94.8% with an Ideal Offset Band of 0.3 mm.

An Active/Gross Surface Utilization coefficient is defined by the Active Surface Area divided by the Gross Surface Area, wherein the Ideal Offset Band is between 0.3 mm and 0.4 mm. Illustratively, the Active/Gross Surface Utilization coefficient is at least equal to 60%, preferably greater than 70%. For electrode 538, the Active/Gross Surface Utilization coefficient is illustratively 78.43% with an ideal Critical Offset Band of 0.3 mm.

An Average Offset Band is defined by the Active Surface Area divided by the Total Edge Perimeter. Illustratively, the Average Offset Band is greater than 0.2 mm and less than 0.4 mm, and most preferably around 0.3 mm. For electrode 538, the Average Offset Band is 0.199. With further reference to FIG. 11, the Active Surface Area Current Density of electrode 538 is illustratively 1.33 A/cm$^2$.

FIGS. 9A-9D illustrate an electrode 638 having a relatively large number of (specifically 33) straight water passageways 650. Electrode 638 may be referenced as having a "sparse 8×12" design. More particularly, three columns 652a, 652b and 652c each of eleven parallel water passageways 650 are formed by walls 654 extending between surfaces 646 and 648. The electrode 638 includes body 640 including surfaces 646 and 648 defining a thickness (t), opposing upper and lower edges 642a and 642b defining an Overall Height (h), and opposing left and right side edges 644a and 644b defining an Overall Length (l). The thickness (t) of the electrode 638 is illustratively 0.5 millimeters (mm). An Exterior Edge Perimeter is defined by the edges 642a, 642b, 644a and 644b, and has a value equal to twice the Overall Height (h) plus twice the Overall Length (l) (i.e., (2×h)+(2×l)). A Gross Surface Area of the electrode 638 is defined by the front surface 646 of the conductive plate 640 within the Exterior Edge Perimeter, more particularly by the product of the Overall Height (h) and the Overall Length (l) (i.e., (h)×(l)). Additional illustrative dimensions of the body 640 of electrode 638 are detailed in FIGS. 11 and 12.

Figure 9A:
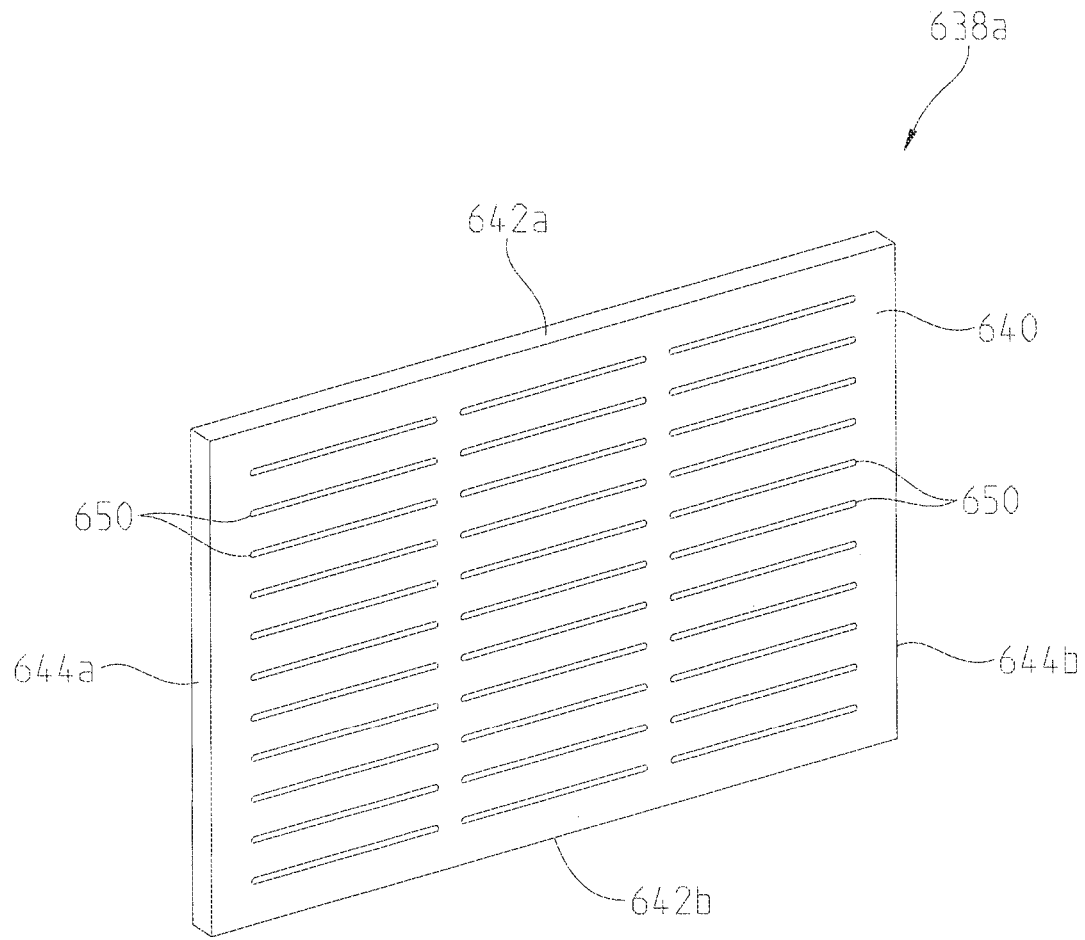
FIG. 9A is a perspective view of an illustrative electrode for use in the electrolytic cell assembly of FIG. 2.
Figure 9C:
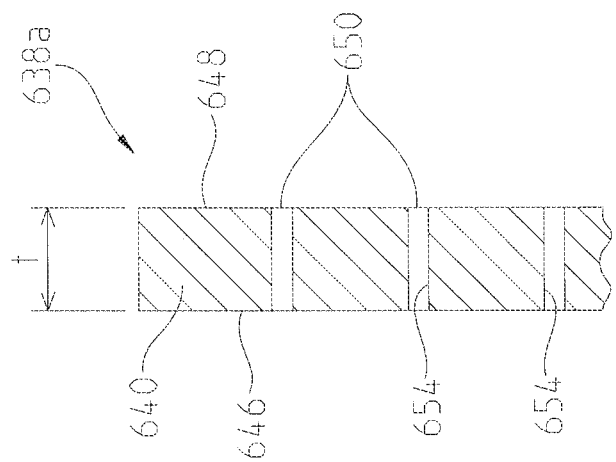
FIG. 9C is a partial cross-sectional view taken along line 9C-9C of FIG. 9B.
Figure 9B:
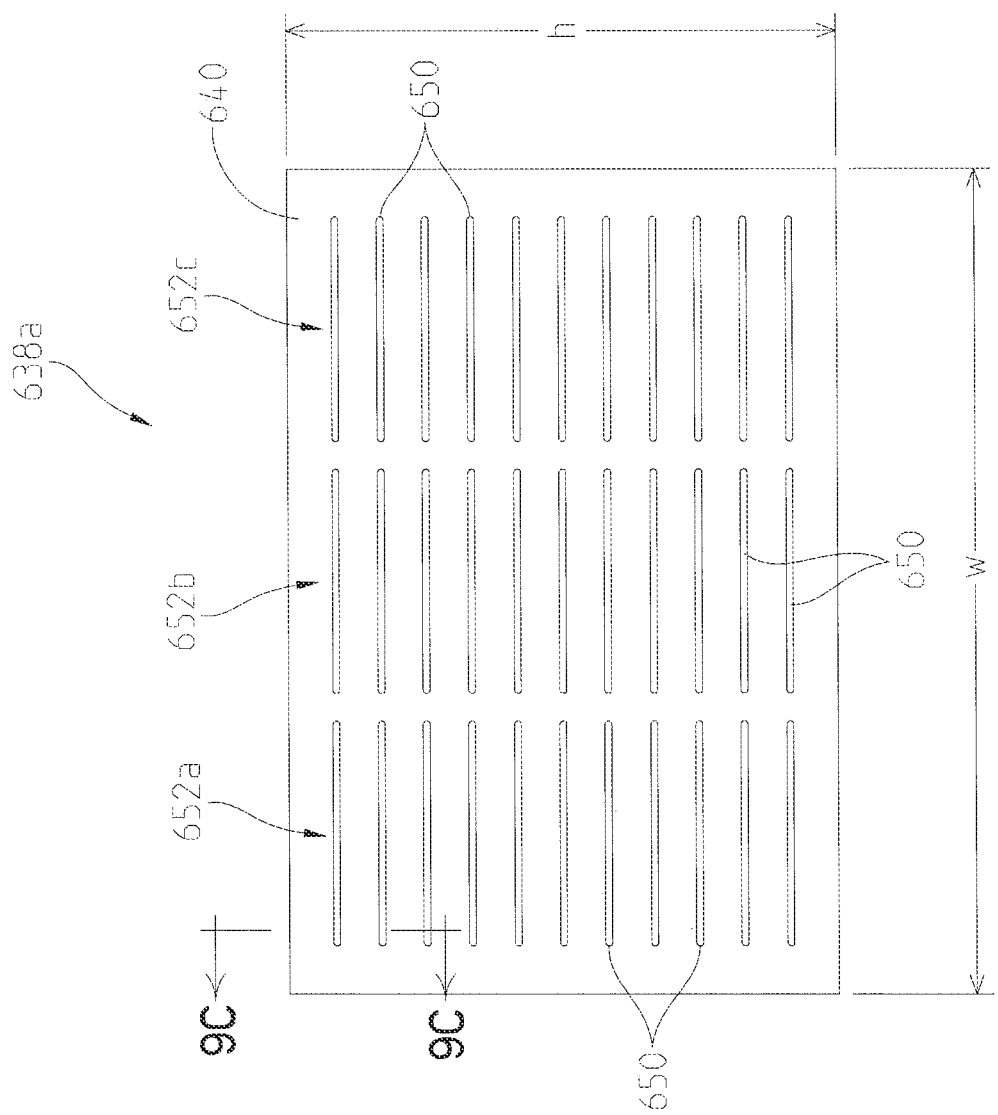
FIG. 9B is a front plan view of the illustrative electrode of FIG. 9A.
Figure 9D:
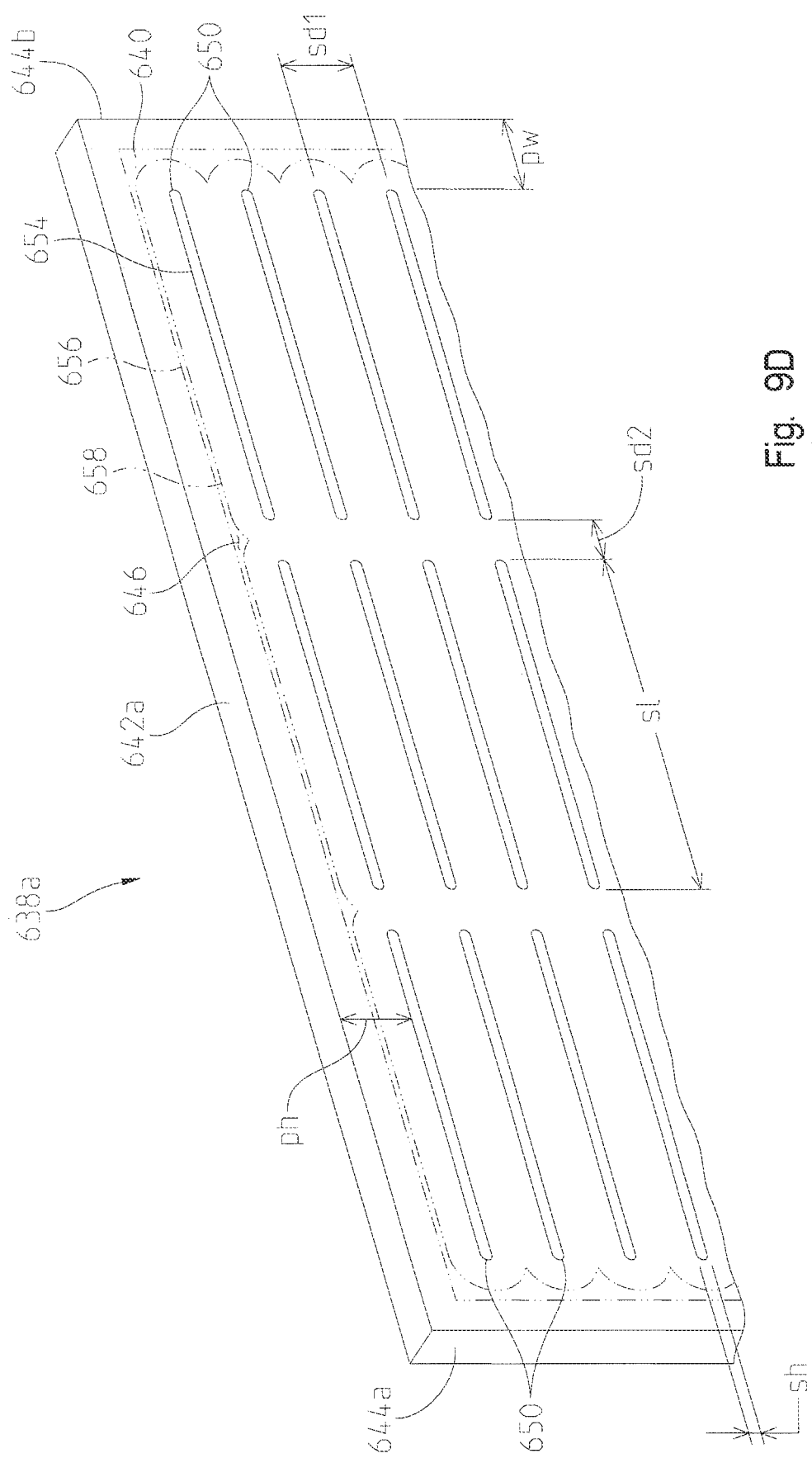
FIG. 9D is an enlarged perspective view of the illustrative electrode of FIG. 9A.
Figure 10A:
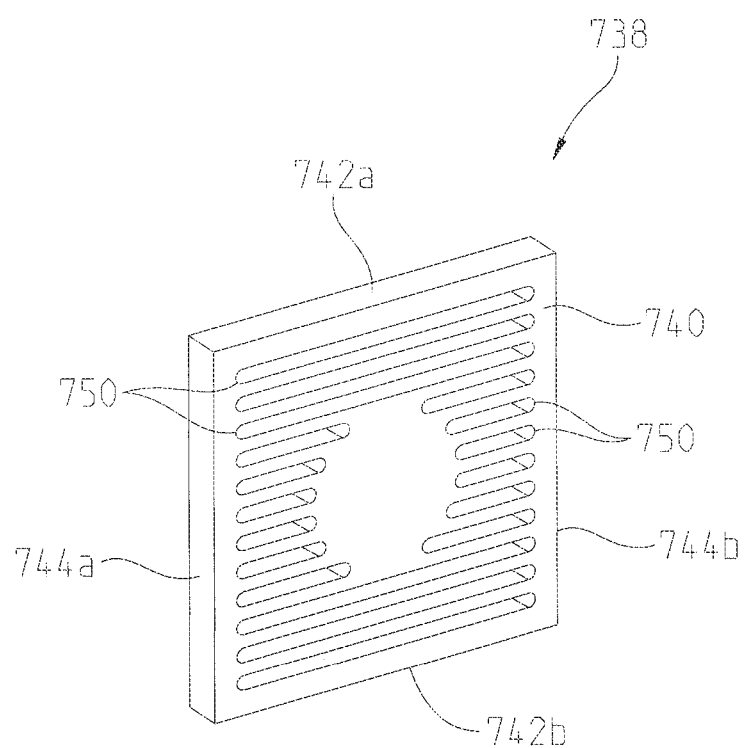
FIG. 10A is a perspective view of a prior art electrode.
Figure 10C:
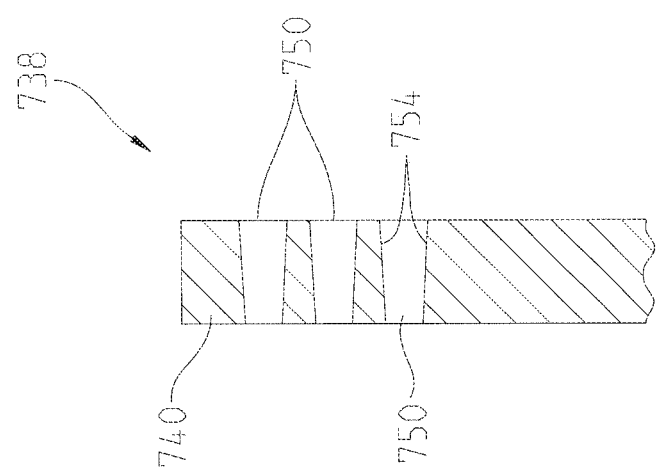
FIG. 10C is a partial cross-sectional view taken along line 10C-10C of FIG. 10B.
Figure 10B:
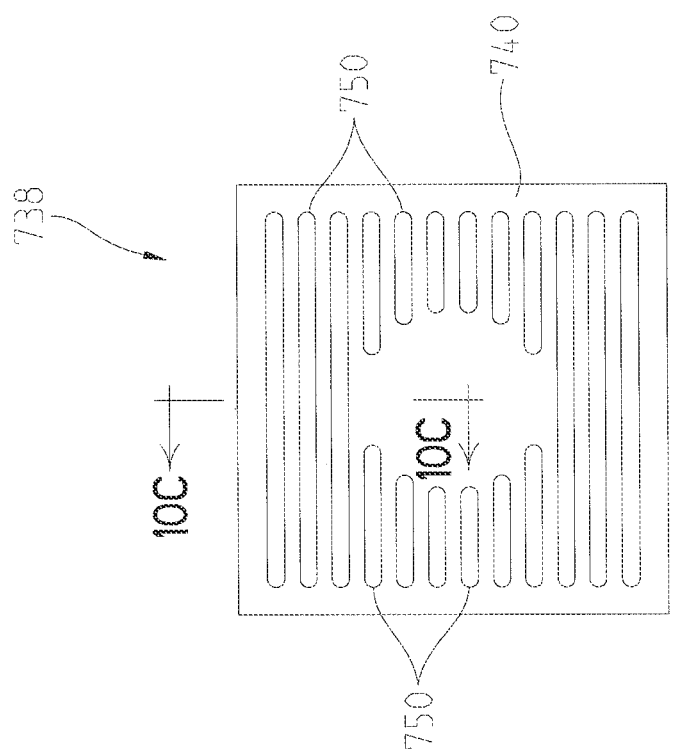
FIG. 10B is a front plan view of the prior art electrode of FIG. 10A.
Figure 10D:
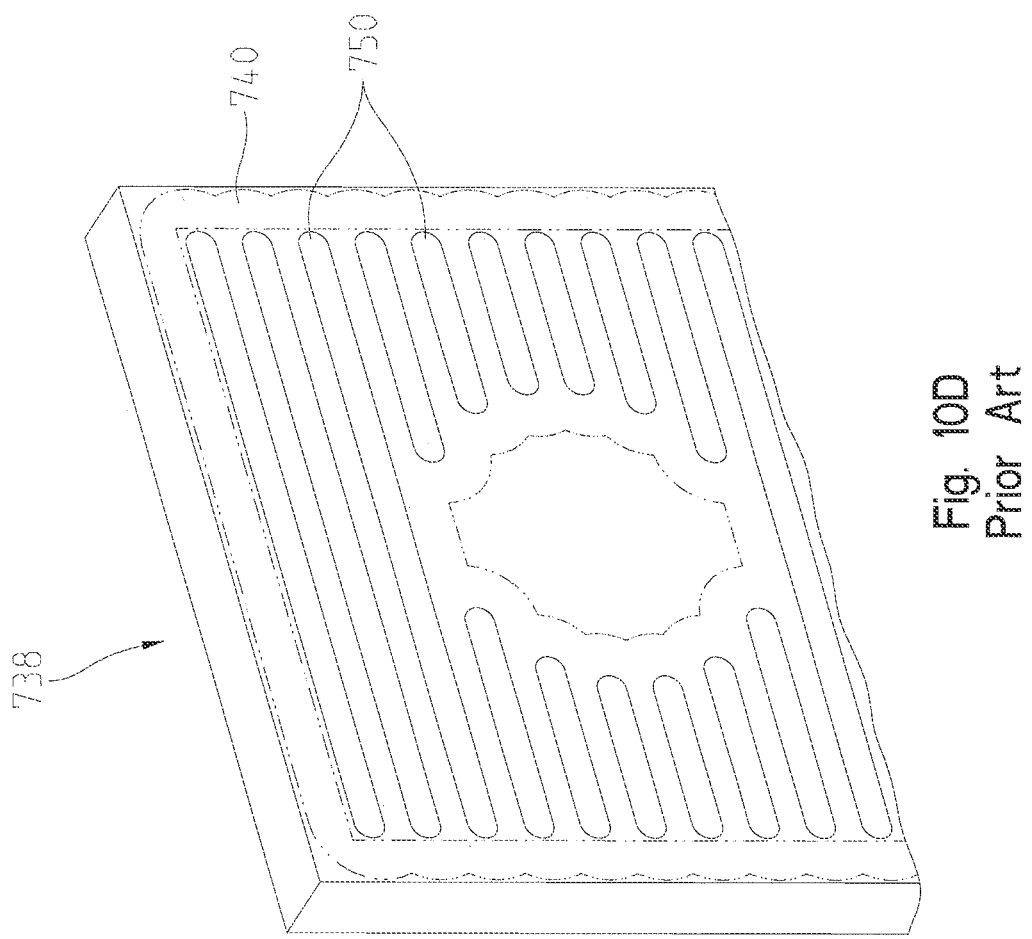
FIG. 10D is an enlarged perspective view of the prior art electrode of FIG. 10A.

With reference to FIGS. 9D and 12, each slot 650 includes an Aperture Height (sh) and an Aperture Length (sl). Adjacent slots 650 have Aperture Centerline Spacing (sd1) and Adjacent Aperture End Spacing (sd2). Aperture Perimeter Height Spacing (ph) is defined in a vertical direction between slots 650 and upper and lower edges 642a and 642b. Aperture Perimeter Width Spacing (pw) is defined in a horizontal direction between slots 650 and left and right edges 644a and 644b. The Aperture Opening Surface Area is defined by the product of the Aperture Height (sh) and the Aperture Length (sl) (i.e., (sh)×(sl)).

With further reference to FIGS. 9D and 12, the slots 650 define a cumulative Aperture Edge Perimeter. An Aperture/Gross Surface Utilization is the percentage of Gross Surface Area not occupied by the Aperture Opening Surface Area. More particularly, the Aperture/Gross Surface Utilization is defined by the equation: (1—(Aperture Opening Surface Area/Gross Surface Area))*100. As shown in FIG. 11, the Aperture/Gross Surface Utilization of electrode 638 is illustratively 88.8%.

The outer body edges 642a, 642b, 644a, 644b define the Exterior Edge Perimeter, while the slot edges or walls 654 define the Aperture Edge Perimeter. The Exterior Edge Perimeter together with the Aperture Edge Perimeter define a Total Edge Perimeter. A Perimeter/Aperture Ratio is defined by the ratio of the Total Edge Perimeter over the Aperture Opening Surface Area. Illustratively, the Perimeter/Aperture Ratio is greater than 15 mm/mm$^2$, preferably greater than 20 mm/mm$^2$. With reference to FIG. 11, the Perimeter/Aperture Ratio of electrode 638 is illustratively 24.2 mm/mm$^2$.

As detailed above, the Total Active Surface Area ultimately determines how much ozone the electrode 638 is capable of producing. Total Active Surface Area defines how much ozone the electrode 638 is capable of producing assuming there is sufficient active band gap. Ideally the Total Active Surface Area would equal the Tangent Surface Area (i.e., the ratio of Total Active Surface Area over Tangent Surface Area, defined as Active/Tangent Surface Utilization, would be equal to 1). This defines the efficiency of the electrode geometry to provide maximum ozone for the smallest electrode.

An Active/Tangent Surface Utilization coefficient is defined by the Active Surface Area divided by the Tangent Surface Area, wherein said Ideal Offset Band is between 0.3 mm and 0.4 mm. Illustratively, the Active/Tangent Surface Utilization coefficient is at least equal to 90%, and most preferably 100%. For electrode 638, the Active/Tangent Surface Utilization coefficient is illustratively 95.8% with an Ideal Offset Band of 0.3 mm.

An Active/Gross Surface Utilization coefficient is defined by the Active Surface Area divided by the Gross Surface Area, wherein the Ideal Offset Band is between 0.3 mm and 0.4 mm. Illustratively, the Active/Gross Surface Utilization coefficient is at least equal to 60%, preferably greater than 70%. For electrode 638, the Active/Gross Surface Utilization coefficient is illustratively 85.09% with an ideal Critical Offset Band of 0.3 mm.

An Average Offset Band is defined by the Active Surface Area divided by the Total Edge Perimeter. Illustratively, the Average Offset Band is greater than 0.2 mm and less than 0.4 mm, and most preferably around 0.3 mm. For electrode 638, the Average Offset Band is 0.315. With further reference to FIG. 11, the Active Surface Area Current Density of electrode 638 is illustratively 1.22 A/cm$^2$.

FIGS. 10A-10D illustrate a prior art electrode 738 having water passageways 750. The electrode 738 includes body 740 including opposing upper and lower edges 742*a* and 742*b* defining an Overall Height (h), and opposing left and right side edges 744*a* and 744*b* defining an Overall Length (l). The gross area of the electrode 738 is defined by (h)×(l). Illustrative dimensions of the body 740 of electrode 738 are listed in FIG. 11.

While this invention has been described as having exemplary designs, the present invention can be modified within the spirit and scope of the disclosure and defined in the following claims.

The invention claimed is:

1. An electrode for use within an ozone generator, the electrode comprising:
    a conductive plate including a front surface and a rear surface extending between an outside edge perimeter, a gross surface area defined by the front surface of the conductive plate within the outside edge perimeter;
    an electro-catalyst coating supported by the front surface of the conductive plate;
    a plurality of apertures formed within the conductive plate, the apertures defining an aperture edge perimeter and an aperture opening surface area;
    a tangent surface area of the conductive plate defined by the gross surface area less the aperture opening surface area;
    a total edge perimeter defined by an outside edge perimeter of the conductive plate and the aperture edge perimeter of the plurality of apertures;
    an operative offset band defined a predetermined distance from the outside edge perimeter and the aperture edge perimeter, the predetermined distance being between 0.2 mm and 0.4 mm;
    a perimeter/aperture ratio defined by the ratio of the total edge perimeter over the aperture opening surface area, the perimeter/aperture ratio being greater than 15 mm/mm$^2$;
    an active surface area defined by the operative offset band within the tangent surface area; and
    an active/tangent surface utilization defined by the ratio of the active surface area over the tangent surface area, the active/tangent surface utilization being greater than 90%.

2. The electrode of claim 1, wherein the conductive plate is formed of silicon.

3. The electrode of claim 2, wherein the electro-catalyst coating is boron doped diamond.

4. The electrode of claim 1, wherein the apertures within the conductive plate are formed by deep reactive ion etching (DRIE).

5. The electrode of claim 1, wherein the active surface area is greater than 50 mm$^2$.

6. The electrode of claim 1, wherein a power supply is in electrical communication with the electrode, and an active surface area current density is less than 2 A/cm$^2$.

7. The electrode of claim 1, wherein the apertures within the conductive plate comprise slots, each having a width in the range of 50 microns to 150 microns.

8. The electrode of claim 1, wherein an active/gross surface utilization is defined by the ratio of the active surface area over the gross surface area, the active/gross surface utilization being greater than 60%.

9. The electrode of claim 1, wherein the plurality of apertures formed within the conductive plate each extend between opposing ends, and include a plurality of arcuate wall portions between the opposing ends.

10. An electrolytic cell for use within an ozone generator, the electrolytic cell comprising:
    a cathode;
    an anode; and
    a hydrophilic electrolytic separator positioned intermediate the cathode and the anode;
    wherein each of the cathode and the anode includes an electrode having a conductive plate, a plurality of apertures formed within the conductive plate, a tangent surface area, an active surface area, and an active/tangent surface utilization defined by the ratio of the active surface area over the tangent surface area, the active/tangent surface utilization being greater than 90%;
    wherein the apertures within the conductive plate are formed by deep reactive ion etching (DRIE) such that the plurality of apertures include straight sidewalls extending substantially perpendicular to opposing surfaces of the conductive plate;
    wherein each conductive plate includes:
    a front surface and a rear surface extending between an outside edge perimeter, a gross surface area defined by the front surface of the conductive plate within the outside edge perimeter;
    a plurality of apertures extending between the front surface and the rear surface, the apertures defining an aperture edge perimeter and an aperture opening surface area;
    the tangent surface area being defined by the gross surface area less the aperture opening surface area;
    a total edge perimeter defined by an outside edge perimeter of the conductive plate and aperture edge perimeter of the conductive plate;
    an operative offset band defined a predetermined distance from the outside edge perimeter and the aperture edge perimeter, the predetermined distance being between 0.2 mm and 0.4 mm;
    a perimeter/aperture ratio defined by the ratio of the total edge perimeter over the aperture opening surface area, the perimeter/aperture ratio being greater than 15 mm/mm$^2$; and
    the active surface area being defined by the operative offset band within the tangent surface area.

11. The electrolytic cell of claim 10, wherein an active/gross surface utilization is defined by the ratio of the active surface area over the gross surface area, the active/gross surface utilization being greater than 60%.

12. The electrolytic cell of claim 10, wherein the apertures of each conductive plate comprise slots, each slot having a width in the range of 50 microns to 150 microns.

13. The electrolytic cell of claim 10, wherein the conductive plate is formed of silicon.

14. The electrolytic cell of claim 13, further comprising an electro-catalyst coating supported by a front surface of the conductive plate, wherein the electro-catalyst coating is boron doped diamond.

15. The electrolytic cell of claim 10, wherein the active surface area is greater than 50 mm².

16. The electrolytic cell of claim 10, further comprising a power supply in electrical communication with the cathode and the anode, and an active surface area current density is less than 2 A/cm².

17. The electrolytic cell of claim 10, wherein the plurality of apertures formed within the conductive plate each extend between opposing ends, and include a plurality of arcuate wall portions between the opposing ends.

\* \* \* \* \*